United States Patent [19]

Lee et al.

[11] Patent Number: 5,214,753
[45] Date of Patent: May 25, 1993

[54] VIDEO SYSTEM WITH PARALLEL ATTRIBUTE INTERPOLATIONS

[75] Inventors: Samuel Lee, San Jose; David L. Sherman, Fremont, both of Calif.

[73] Assignee: Shographics, Inc., Mountain View, Calif.

[21] Appl. No.: 794,655

[22] Filed: Nov. 15, 1991

Related U.S. Application Data

[63] Continuation of Ser. No. 388,081, Jul. 31, 1989, abandoned.

[51] Int. Cl.[5] .............................................. G06F 15/62
[52] U.S. Cl. ..................................... 395/125; 395/130
[58] Field of Search ................ 364/522; 340/728, 729, 340/739, 744, 747; 395/129-132, 125, 163

[56] References Cited

U.S. PATENT DOCUMENTS 4,791,582 12/1988 Ueda et al. ........................... 364/522
4,805,116 2/1989 Liang et al. .......................... 364/521

Primary Examiner—Gary V. Harkcom
Assistant Examiner—Mark K. Zimmerman
Attorney, Agent, or Firm—Skjerven, Morrill, MacPherson, Franklin & Friel

[57] ABSTRACT

A mathematical computation circuit to interpolate attribute values along a line between two points where the attributes are known and a video circuit using the interpolation circuit. The interpolation circuit includes a circuit to calculate the rate of change of said attribute between said two points on a raster-scanned display on a per scan line basis and a circuit to add the rate of change of said attribute per scan line to the current attribute value for the current scan line as each new scan line occurs. The sum is used as the new current value. A video system uses multiple instances of this interpolation circuit and includes a sorter to sort vertices records from a display list and send the appropriate attribute data to the interpolation circuits. There rates of change are calculated and attribute values developed for each pixel location. A video control circuit then generates color, saturation and intensity data for use in filling a frame buffer in accordance with addresses generated by an address generation circuit. The frame buffer is then read to generate the display.

9 Claims, 12 Drawing Sheets $$H = H_1 + NS_x$$

$$S_x = \frac{H_2 - H_1}{V_2 - V_1}$$

$$S_i = \frac{I_2 - I_1}{V_2 - V_1}$$

SEQUENCE OF EVENTS

| "TIME" | EVENT(S) |
|---|---|

①    $X_L \leftarrow X_1$

②    $CTR \leftarrow Y_1$

③    $X_R \leftarrow X_3$

④    $X_L \leftarrow X_2$, $X_2 - X_1 \rightarrow$ NUMERATOR REGISTER OF DIVIDER-LEFT    $ACC\_L \leftarrow X_1$ ⑤    $Y_L \leftarrow Y_2$, $Y_2 - Y_1 \rightarrow$ DENOMINATOR REGISTER OF DIVIDER-LEFT ⑥    $X_R \leftarrow X_4$, $X_4 - X_3 \rightarrow$ NUMERATOR REGISTER OF DIVIDER-RIGHT    $ACC\_R \leftarrow X_2$ ⑦    $Y_R \leftarrow Y_4$, $Y_4 - Y_3 \rightarrow$ DENOMINATOR REGISTER OF DIVIDER-RIGHT

⑧    DIVIDER-LEFT AND DIVIDER-RIGHT START CALCULATION $$\text{SLOPE-L} = \frac{X_2 - X_1}{Y_2 - Y_1} \qquad \text{SLOPE-R} = \frac{X_4 - X_3}{Y_3 - Y_3}$$

AT THIS TIME ACC-L OUTPUT IS $X_1$ AND INPUT IS SLOPE-L, AND ACC-L OUTPUT IS $X_3$ AND INPUT IS SLOPE-R

ALSO, DONE FLAG SET WHEN DIVIDE IS DONE

⑨    <u>OPTIONAL</u> SEND ACC_L AND ACC_R OUTPUTS ($X_1$ & $X_3$) FOR USE IN FILLING FRAME BUFFER

⑩    $CTR \leftarrow CTR-1$
      $ACC\text{-}L \leftarrow ACC\text{-}L(X_1) + \text{SLOPE-L}$
      $ACC\text{-}R \leftarrow ACC\text{-}R(X_3) + \text{SLOPE-R}$ ⑪    REPEAT STEPS 9 & 10 UNTIL CTR IS LESS THAN OR EQUAL TO CONTENTS OF $Y_L(Y_2)$ OR $Y_R(Y_4)$

Fig. 7

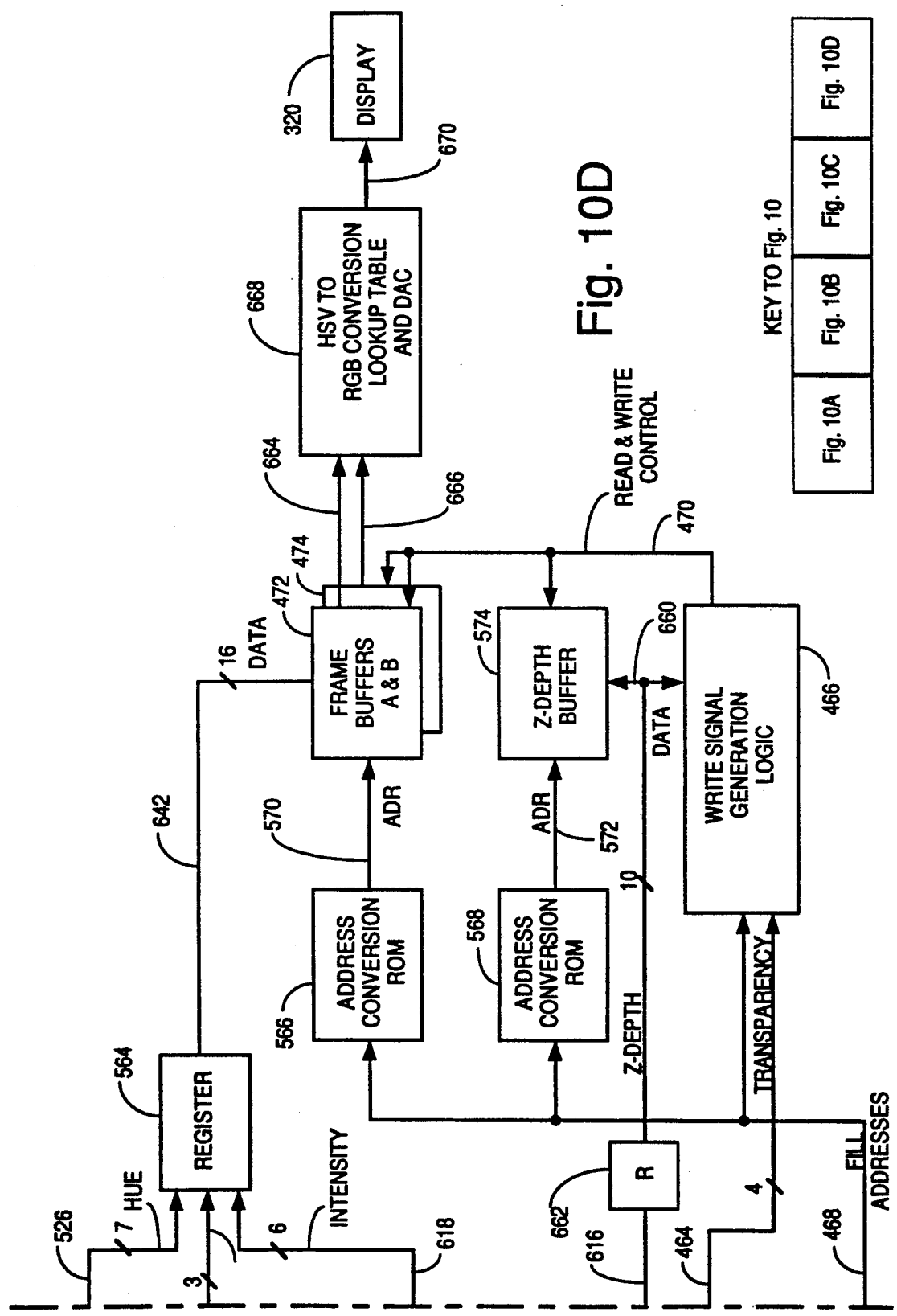

VIDEO SYSTEM WITH PARALLEL ATTRIBUTE INTERPOLATIONS

This application is a continuation of application Ser. No. 07/388,081, filed Jul. 31, 1989 now abandoned.

BACKGROUND OF THE INVENTION

The invention pertains to the field of videographic machines for computer-aided design and for simulation. More particularly, the invention pertains to the field of circuitry for use in performing Z-buffering, Gouraud shading, and texture mapping in such machines by calculation of the intersections between raster lines and polygon sides.

Z-buffering, Gouraud shading and texture mapping are features which are normally found on very expensive and complex graphics workstations since these features greatly improve the quality of the graphic presentation. Many graphics workstations which cost as much as $50,000 do not have Gouraud shading.

Gouraud shading, or intensity-interpolation shading, eliminates intensity discontinuities at edges and varies the intensity of the fill of a polygon thorughout thereby creating a smoother surface appearance. Typically in graphics machines, three-dimensional objects having curved surfaces are represented by a plurality of flat polygons which are joined at their boundaries to approximate the curved surface. In a machine which does not have Gouraud shading, each polygon will be shaded with an intensity which is calculated based upon the polygon's position and orientation in space relative to the light source. Where adjoining polygons have different orientations in space, the pixels in these polygons may have different intensities. The result is that the boundary between the two polygons becomes quite visible because of the difference in intensity of the pixels on either side of the boundary. This detracts from the graphic representation because such sudden changes in intensity are not normally seen on curved surfaces.

Machines that do not use Gouraud shading often use flat shading, which results in an even or equal intensity at all pixels on a scan line passing through a particular polygon. The technique of Gouraud shading tends to remove the edges on a curved surface comprised of polygons joined at a shallow angle by calculating normals for the vertices of polygons which are the average of the normals for all the polygons which are joined to form the vertices. This "vertex normal" is used only for intensity calculations, thereby making the intensity on the edges of the associated polygons blend on either side of the edges so as to effectively make the edges disappear or fade in significance.

The Gouraud shading process consists of four steps. First, surface normals are calculated for each polygon. Second, vertex normals (a line perpendicular to the edge which bisects the angle between the plane surfaces which define the edge) are calculated by averaging the surface normals of all polygon facets that share the vertex. If an edge is meant to be visible, such as at the joint between a plane's wing and body, then two vertex normals, one for each side of the edge, are found by separately averaging the normals of polygons on each side of the edge. Third, vertex intensities are found by using the vertex normals with any desired shading model. Finally, each polygon is shaded by linear interpolation of vertex intensities along each edge and then between edges along each scan line.

The interpolation along edges can easily be integrated with the scan line hidden surface algorithm. With each edge, the starting intensity and the change of intensity for each unit change in the Y direction is stored. Then the visible span of a scan line passing through a polygon is filled by interpolating the intensity values of the two edges that bound the span. This technique has a tendency to remove the faceted appearance of an object and make the surface look smooth.

Gouraud shading is, therefore, an alternative form of calculating the shading at each pixel on a polygon by calculating the intensities at the vertices or at specific points on the polygon and assuming that the intensity varies linearly between the calculated points. This allows the polygon to be painted much faster, since the intensity at each point does not need to be calculated other than by the aforementioned interpolation. This interpolation is the same sort of mathematical operation that must occur in texture mapping and in various other operations that must be performed in the video circuitry of a CAD machine.

Heretofore, Gouraud shading was done in software or with, very complicated discrete circuitry. Thus, there has arisen a need for a simple, integrated and inexpensive circuit for implementing Gouraud shading on graphic workstations that are less expensive. Preferably, this circuitry would be such that it would be identical with circuitry used for other functions such as texture mapping etc. so that a single integrated circuit design could be used to do many different functions that normally found in only much more expensive machines.

Texture mapping is the process of mapping a pattern or color or some other texture onto a polygon at fill time. Fill time is the time during which the various pixels of a graphic image to be displayed have the digital data representing those pixels loaded into a frame buffer. A frame buffer is a memory which stores video data in the form of digital numbers which are used to control circuitry which cause the intensity and color control circuitry of a raster-scanned video display circuit to properly drive a cathode ray tube so as to display the image.

Texture mapping on a raster scanned display, like Gouraud shading, requires interpolation. A raster—scanned display is comprised of a plurality of horizontal scan lines which are parallel and spaced close together and which define the tracks along which the electron beam or beams of a cathode ray tube sweep along the phosphor coated surface of the tube. The image on the screen is "painted" by electronically sweeping the electron beam or beams from one edge of the screen to the other with changing intensity which changes with changing position to cause various patterns of intensity of light to appear on the screen.

To illustrate the concept of texture mapping, assume that the image to be displayed is a simple square which is tilted in three-dimensional space at an angle such that the normal to the surface of the square polygon is at an angle to all three orthogonal axes of a cartesian coordinate system. Suppose also that a texture map comprising the face of Winston Churchill is to be painted within this tilted polygon. Suppose also that the polygon is to be rotated and translated through three-dimensional space with the face of Winston Churchill constantly painted thereon such that the resulting display looks like a portrait of Winston Churchill on a square canvas which is tumbling as it flies across the screen. Texture mapping is the process of mapping the raster lines that pass through the image of the polygon on the screen to a fictional raster line that passes through the texture map at some angle. The angle that this line makes through the texture map causes the raster line to be painted such that the canvas appears on the screen the same way the canvas would look if the screen were a window and the canvas was viewed in whatever orientation in space the canvas currently had. In other words, texture mapping is the process of causing the two-dimensional display to be painted in such a way that the face of Winston Churchill is seen as it would be seen by the observer of the display when looking at an actual portrait of Winston Churchill tumbling through space at the particular angle which the portrait assumes at the moment in question.

More precisely, texture mapping is the process of mapping a raster line through a polygon to a corresponding line through the texture map and then using the pixels in the texture map which appear on the mapped line to paint the pixels the correct color and intensity on the corresponding raster line which passes through the polygon. This is done for every raster line and every pixel in the polygon and is done for every orientation of the polygon in three-dimensional space as it is projected onto a two-dimensional plane for display. This allows a patterned array representing a digitized image of the texture map to be mapped onto either a planar or curved surface on an object to be displayed. Values from the pattern array are used to control the intensity of the pixels of the displayed surface so that the surface appears to have the same texture as the texture map.

Texture mapping is done in two steps. First, the texture mapping of the selected texture pattern onto the object surface is done. Then, 3-D to 2-D projection and clipping transformation mapping of the 3-D object onto the 2-D screen is done.

In the prior art, texture mapping has been done in software. Software is generally slower than hardware, and thus there has arisen a need for a hardware circuit to do texture mapping which is simple, fast and economical. Since texture mapping involves interpolation, preferably the circuitry to do texture mapping would be similar to the circuitry used for Gouraud shading to minimize the expense of such circuitry.

Z-buffering is a method of preventing the display of hidden edges and hidden polygons in a three-dimensional image which has been mapped onto a two-dimensional display. That is, polygons and edges which are deeper, in space, i.e., farther away from the viewpoint of the observer, may be obscured by other polygons which are closer to the observer and which lie in the line of sight from the viewpoint of the observer to the deeper polygon. When a three-dimensional object comprised of polygons which are joined to form the surface of the object has such an orientation, to display the edges and polygons which would normally be hidden on a two-dimensional graphics display causes confusion and unnecessary complexity. Z-buffering includes the process of sorting the polygons by depth and generation of an ordered list of polygons. This list of polygons is then examined on the fly and the depth of each pixel of each polygon is calculated at fill time for purposes of determining the final video data which will be placed in the frame buffer. Thus a polygon may be only partially obscured.

There are several ways of performing Z-buffering. One way is to fill the frame buffer with the pixels of a particular polygon at fill time for that polygon. Then, when another overlapping polygon is to have its pixels added to the frame buffer, a comparison is made on a pixel-by-pixel basis between the depth of each pixel in polygon 2 versus the depth of any pixel having the same x,y coordinate in polygon 1. If a pixel in the second polygon which overlaps a pixel in the first polygon has a Z depth which is closer to the eye of the observer than the Z depth of the corresponding overlapped pixel, then the pixel from polygon 1 is overwritten with the data representing the pixel from polygon 2 in the frame buffer. This is done on a pixel-by-pixel basis such that the Z depth of each pixel controls whether the pixel will be displayed.

The Z-buffering process can be carried out by interpolation. This is done by calculating the z coordinate of the pixels at each end of a raster scan line where it intersects the edges of a polygon. Then, the z depth of individual pixels along the raster scan line are calculated by interpolation between the z depths of the pixels at the intersections between the raster scan line and the edges of the polygon.

Thus a need has arisen for simple, economical circuit which can perform the mathematical calculations necessary for Gouraud shading, texture mapping and Z-buffering. Preferably, this circuit should be in integrated form such that multiple copies of it may be made for dedication to the performance of individual ones of the three functions identified above.

SUMMARY OF THE INVENTION

According to the teachings of the invention, there is disclosed a circuit for calculating the intersection points between raster lines and the sides of polygons displayed on a graphics display. The circuit is also useful for interpolation of attribute values at points along a line between two points on a video display at which the attribute values are known.

An apparatus according to the teachings of the invention includes circuitry to receive data regarding the value of an attribute at two points on a display and to calculate the difference in the attribute value between these two points. Other circuitry, or the same circuitry that calculates the above difference, then calculates the difference between the scan line number for the raster scan line which passes through or near one of the points and the scan line number for the scan line that passes through or near the other point.

Slope or rate of change calculation circuitry then calculates the rate of change of said attribute value per scan line.

An accumulator circuit having a register to store the current value of the attribute and an input coupled to receive the slope or rate of change data then is used to do the interpolation. The accumulator adds the rate of change to the current value to obtain the new current value for each new scan line. The sum is used to update the current value. Each time a new scan line is to be painted on the display, an accumulation cycle is performed to add the slope to the current value.

In the preferred embodiment, two parallel channels of circuitry perform the above described calculations for two edges simultaneously.

BRIEF DESCRIPTION OF THE DRAWINGS

FIG. 7 is the sequence of events carried out in the embodiment of FIGS. 1A and 1B to do the interpolation calculations.

FIGS. 10A through 10D are a block diagram of another embodiment of the invention.

DETAILED DESCRIPTION OF THE PREFERRED EMBODIMENT

Figure 1A:
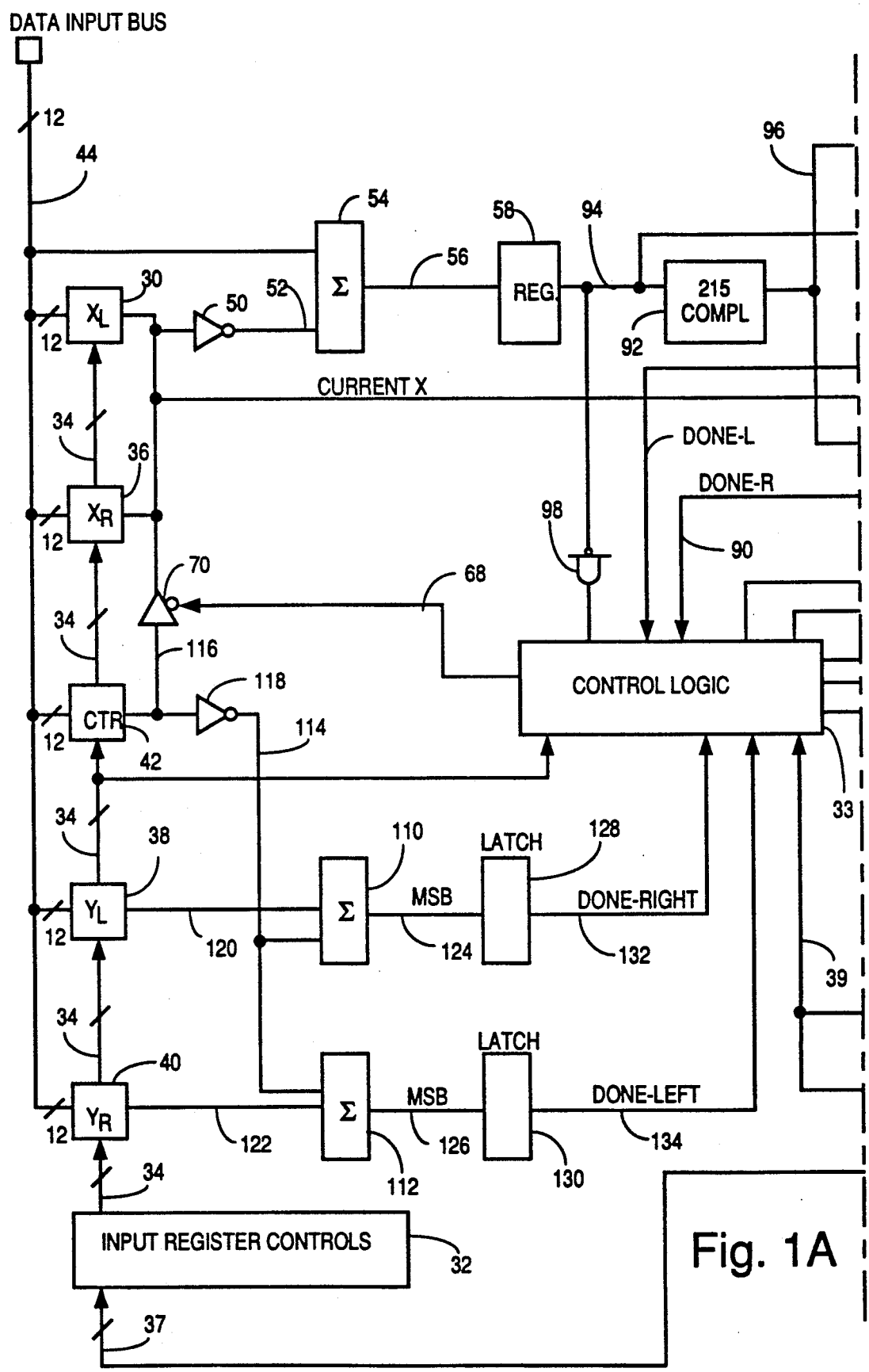
FIGS. 1A and 1B are a block diagram of the preferred embodiment of the invention.
Figure 1B:
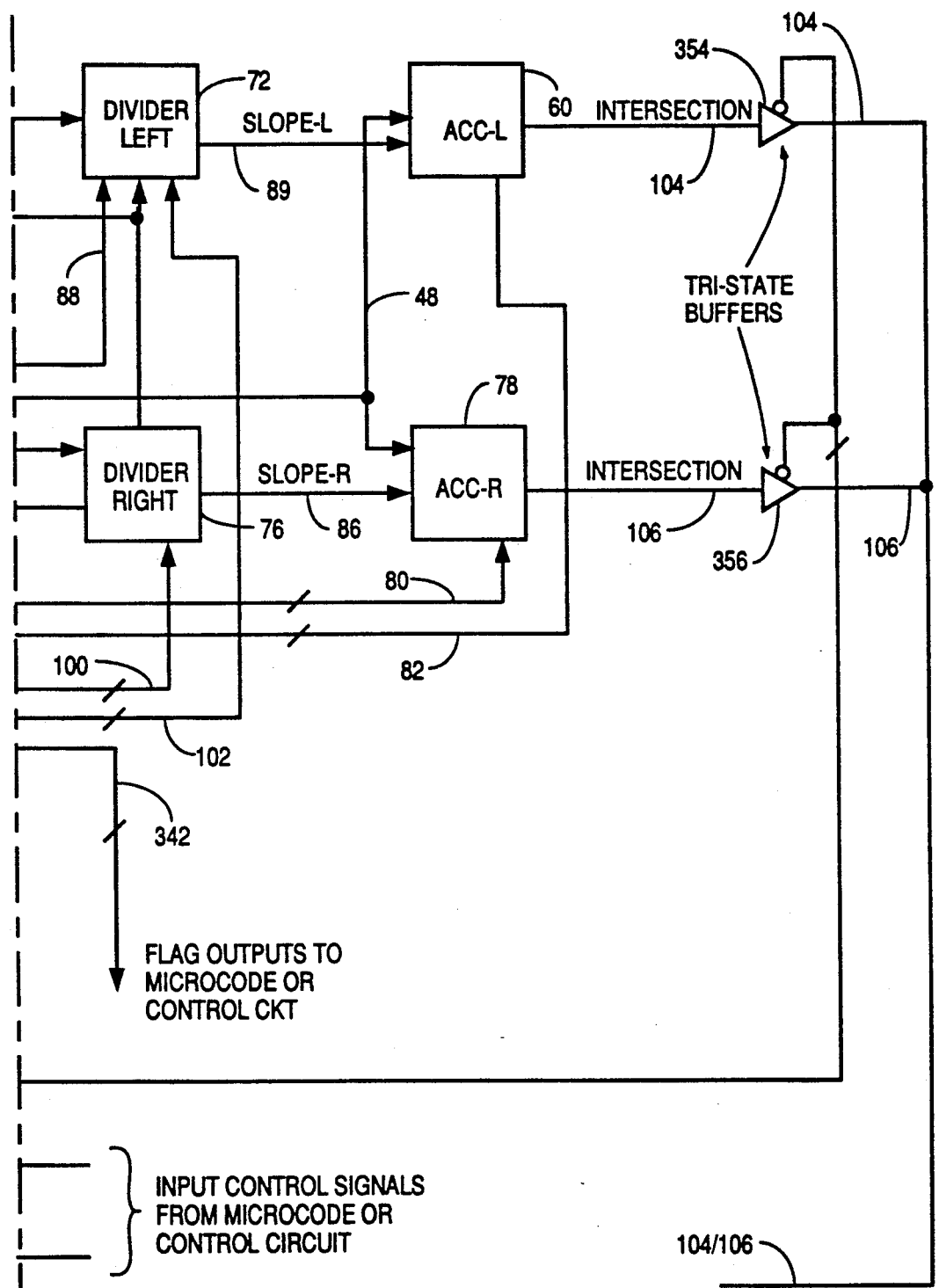

Referring to FIGS 1A and 1B there is shown a block diagram of a generic version of a calculation circuit which can support Gouraud shading, texture mapping, Z-buffering and other functions necessary for a low cost, high capability CAD system.

The purpose of the circuit in FIGS. 1A and 1B is to calculate slope or gradient between the attributes, e.g. position on the screen, position in a texture map, Gouraud intensity, Z-axis depth, etc., at two points and to use that slope information to do interpolation to determine the attributes of points along a line between the two points. The circuit of FIGS. 1A and 1B can also calculate the positions of the intersections between the edges of a polygon making up an object to be displayed and a raster scan line which passes through the polygon. Calculation of the intersection points of a raster line with the sides of a polygon through which it passes is the example that will be used to illustrate the operation of the circuit of the invention. Those skilled in the art will be able to apply this teaching for use of the circuit of FIGS. 1A and 1B for calculating Gouraud shading, Z-buffering and texture mapping.

Figures 2, 3, 4, 5:
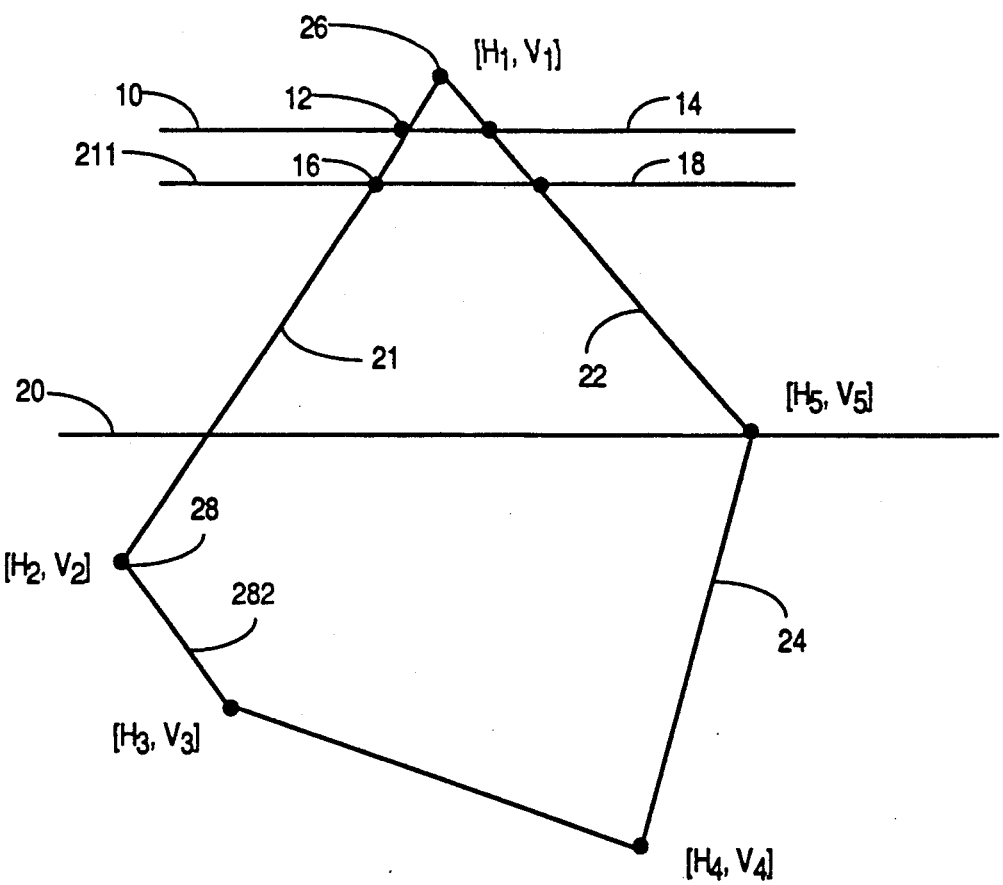
FIG. 2 is an exemplary polygon used to illustrate some of the teachings of the invention.
FIG. 3 is the mathematical expression used to do the interpolation.
FIG. 4 is the mathematical expression used to calculate the rate of change of an attribute between two points of a display.
FIG. 5 is a mathematical expression used to calculate the rate of change of Gouraud Shading Intensity.

Calculation of the intersection points of a raster line is best understood by reference to FIG. 2. FIG. 2 shows a polygon comprised of multiple vertices joined by straight sides. These vertices are identified by their horizontal and vertical positions. For example, vertex 1 has coordinates $H_1$ and $V_1$ identifying its horizontal and vertical positions, respectively, vertex 2 has coordinates $H_2$, $V_2$, and vertex 3 has coordinates $H_3$, $V_3$, and so on for all the vertices around the polygon. A scan line 10 passes through the polygon and intersects the side between the first vertex and the second vertex at a point 12. The scan line 10 intersects the side between the first vertex and the fifth vertex at a point 14. The circuitry of FIGS. 1A and 1B can calculate the horizontal positions of the intersection points between a raster line and the edges of a polygon (the vertical positions of these intersection points are known by virtue of knowing the scan line number) as well as the positions in space for all the pixels along the scan line including the intersection points 12 and 14.

In the preferred embodiment, the circuit of FIGS. 1A and 1B is an integrated circuit, and contains two parallel circuits, each of which is adapted to calculate one of the intersection points 12 and 14 (where position is the calculated attribute).

The structure of the circuit of FIGS. 1A and 1B will be explained in context of a discussion of the operation of the circuit. A sequence of events will be given to calculate the intersection points like points 12 and 14 for raster line 10 for each of a plurality of parallel raster lines as they occur during each field of video.

Referring again to FIG. 2, the function of the circuit of FIGS. 1A and 1B is to calculate the horizontal positions of the intersection points 12 and 14 for raster line 10 in FIG. 2 and then to calculate the horizontal positions of the intersection points 16 and 18 for raster line 11. This process continues for all the raster lines between raster line 11 and raster line 20. One portion of the circuit of FIGS. 1A and 1B calculates the intersection points with edge 21, while another portion of the circuit of FIGS. 1A and 1B calculates the intersection points with edge 22. Calculations are based upon the slopes of edges 21 and 22.

Raster line 20 marks a change in the operation of the circuit of FIGS. 1A and 1B because the slope changes from the slope of edge 22 to the slope of edge 24. Since slope plays a key role in the interpolation calculation, new data must be loaded into the portion of the circuit of FIGS. 1A and 1B that is calculating intersection points for the right side of the line.

To illustrate the theory of operation of the circuit of FIGS. 1A and 1B refer to FIG. 3 which gives the mathematical equation which is calculated by the circuit for each edge. In FIG. 3, N is the number of the scan line relative to the scan line that passes through the first vertex at point 26, and Sx is the slope of the edge 21 as given by the mathematical equation of FIG. 4. In the equation of FIG. 4, the numerator represents the total change in horizontal position between the vertices at points 26 and 28, while the denominator represents the number of scan lines between the vertices at points 26 and 28.

The equation of FIG. 4 is carried out by the portion of the circuit of FIGS. 1A and 1B that calculates intersections with edge 21. The portion of the circuit that calculates intersections with edge 22 carries out a similar equation but uses the difference in horizontal position for a unit change in vertical position for the edge 22.

The circuit of FIGS. 1A and 1B be used to calculate Gouraud shading intensity, Z-buffer depth, or texture mapping variables, i.e., position in the texture map which maps to position on the screen, simply by substituting for H1, the appropriate attribute at vertex 1, point 26. That is, to calculate the change in Gouraud shading intensity along the edge 21, the Gouraud shading slope along this edge is calculated using the Gouraud shading intensity attributes, I1 and I2, respectively, at the first and second vertices, points 26 and 28, respectively. FIG. 5 gives the equation for the slope Si in Gouraud shading intensity along edge 21. Note that like the case for the slope or change in horizontal position per scan line, the denominator V2-V1 represents the number of scan lines between points 26 and 28. The slope for the Z-buffer depth attributes Z1 and Z2 or the texture mapping position variable T1 and T2 at the first and second vertices, respectively, may be calculated by substituting the values for these variables into the numerator of either of the equations of FIGS. 4 or 5.

Figure 6:
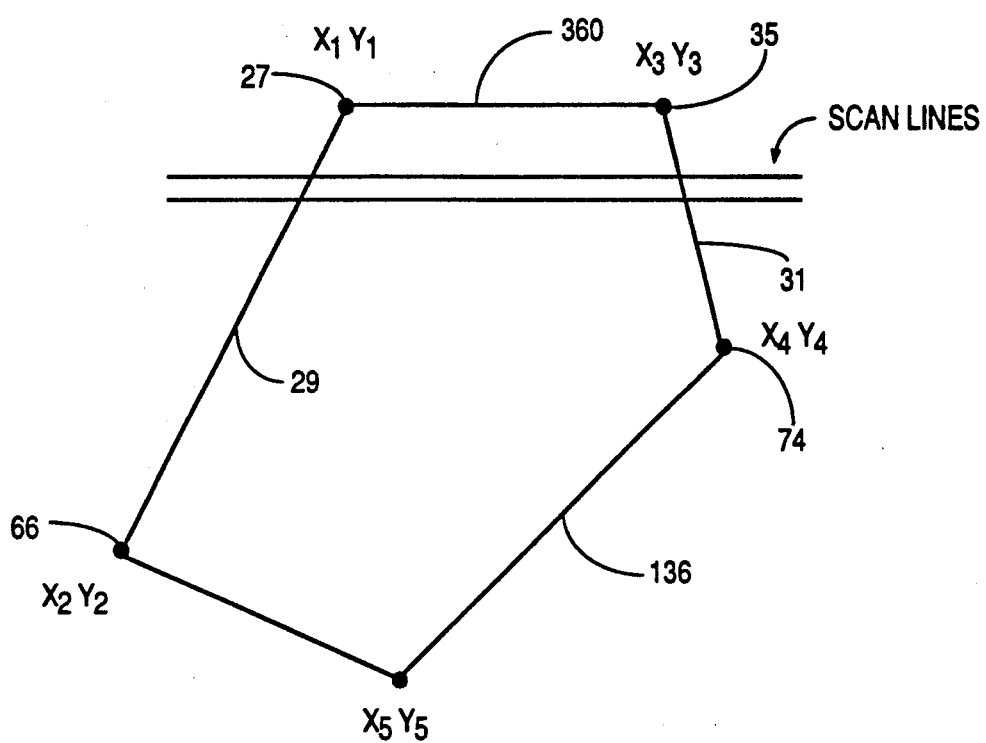
FIG. 6 is the exemplary polygon used to illustrate the operation of the embodiment of FIG. 1.

Referring to FIGS. 1A, 1B, 6 and 7, there will be described a sequence of events which calculates the intersection points between each raster line and two sides of a polygon through which it passes. FIG. 6 shows the polygon which will be used in the hypothetical example used to illustrate the operation of the circuit of FIGS 1A and 1B. FIG. 7 shows the sequence of events that occurs during operation of the circuit of FIGS. 1A and 1B to calculate the intersection points of individual scan lines in FIG. 6 with the edges 29 and 31. In FIG. 7, the "times" are not literal times or time slots. They merely indicate the order in which things occur.

The sequence of events is controlled by microcode in a control unit which does not form part of the invention. The microcode generates control signals which are coupled to an input register controls circuit 32 via a bus 37 and a control logic circuit circuit 33 via a bus 39. These two circuits then generate the proper control signals to cause the various other elements of the circuit of FIGS. 1A and 1B to perform the functions necessary to perform the calculation.

The details of the design of the control logic 33 and the input register controls 32 are not critical to the invention so long as the proper control signals are generated in the proper sequence to cause the sequence of events of FIG. 7 and to be described next to occur.

The operation of the circuit of FIGS. 1A and 1B will be described with reference to the polygon of FIG. 6 although the operation of the circuit of FIGS. 1A and 1B would be the same for the polygon of FIG. 2 if $X_1$ and $X_2$ were set equal.

The sequence of events to calculate the intersection points begins at time 1 in FIG. 7 by loading a register 30 with the horizontal position $X_1$ of the first vertex 27. An input register controls circuit 32, under the control of microcode or some other sequential state machine (not shown), causes this loading at the proper time by activating the appropriate line of a control bus 34 which is coupled to the load inputs of each of a plurality of input registers 30, 36, 38 and 40 and to the load input of a counter 42. The value of the $X_1$ attribute appears on a data input bus 44 at the time that the load signal to register on bus 34 is activated. The data input bus 44 is time division multiplexed so that the various items of attribute data and scan line number data involved in the calculation arrive at different times and are loaded into the appropriate circuits. Appearance of the attribute value $X_1$ on the bus 44 when the load signal to register 30 is active causes the value of the $X_1$ attribute to be latched into the register 30 and held.

Next, at time 2, the vertical position attribute $Y_1$ of vertex 27 is caused to be loaded into the counter 42. This loading occurs when the microcode sends the proper control signal on bus 37 to cause circuit 32 to activate a load signal for the counter 42 on bus 34. The vertical position is expressed in terms of the scan line number which passes through the vertex 26 in FIG. 2.

Because the intersection points between the scan lines and both edges 29 and 31 are calculated simultaneously, the starting horizontal position for the vertex 35 must be loaded. Thus, at time 3, the horizontal position attribute of vertex 35, $X_3$, is loaded into the register 36.

Next, the numerator of the slope equation of FIG. 4 is calculated (with $X_1$ and $X_2$ substituted for $H_1$ and $H_2$, respectively). To calculate $X_2 - X_1$, the value of $X_2$ is placed on the bus 44 and the input register controls circuit causes the value of $X_2$ to be written into the register 30. However, during this same bus cycle, the original contents of the register 30, $X_1$, remain on the output bus 48 because of the design of the latch 30. The value of $X_1$ is automatically complemented by the action of the inverter 50 such that the complement of $X_1$ appears on the bus 52. This bus is coupled to one of the data inputs of a summer 54. The other data input of this summer is coupled to the input data bus 44 and receives the value of $X_2$.

The summer 54 is combinational logic which automatically adds any data appearing at the data inputs coupled to buses 52 and 44. Adding a number and the complement of another number and adding 1 to the result is the same as subtracting the two numbers from each other. The design of the summer 54 is conventional and includes circuitry to add 1 to the result of the addition of the numbers on buses 52 and 44. The result is $X_2 - X_1$ and is output on bus 56 for storage in a pipeline register 58. Simultaneously, the value $X_1$ on bus 48 is latched into a current-X-left register (not shown) inside the accumulator-left circuit 60.

At time 5, the scan line number $Y_2$ for the scan line passing through the vertex 66 in FIG. 6 is loaded into the $Y_L$ register 38 and resides on the input data bus 44. Simultaneously, the microcode issues a control signal on the bus 39 so as to cause the control logic 33 to activate a signal on line 68 to a tri-state buffer 70 tri-state control input. The tri-state buffer serves to electrically isolate the data output of the counter 42 from the bus 48 when the data in the counter 42 is not involved in a calculation. The calculation that occurs during time 5 is the subtraction of $Y_1$ from $Y_2$, so the data in the counter 42, $Y_1$, is involved in the calculation and the buffer 70 must be controlled to couple the output of the counter 42 to bus 48. The inverter 50 then inverts $Y_1$ on bus 48, and the adder 54 adds $Y_2$ on bus 44 to the inverted form of $Y_1$ on bus 52 and adds 1 to the result to generate the denominator term of the slope equation, $Y_2 - Y_1$. This term is latched into the pipeline register 58. The contents of the pipeline register 58 were previously caused by the microcode and the control logic 33 to be latched into the numerator register (not shown) of the divider-left circuit during time 4.

In the case of the example polygon of FIG. 6, $Y_3$ is equal to $Y_1$ so $Y_3$ does not have to be separately stored In the general case for the polygon of FIG. 2, both the right edge and the left edge circuits do calculations for edges that start from the same vertex. Thus, in either of these two cases, it is not necessary to separately store the Y position of the vertex which starts the right edge because it is the same as the Y position for the vertex which starts the left edge. Therefore, the storage of the value of $Y_1$ in the counter 42 during time 2 is all that is necessary to provide sufficient data to calculate the denominator term for both the right and the left edges. In the most general case, the right and left sides start from the same vertex. In such a case, the operation of the circuit of FIGS. 1A and 1B is the same as described herein except that $X_1$ and $Y_1$ are substituted for $X_3$ and $Y_3$. This substitution is implemented under control of the microcode.

During time 6, the numerator term for the slope equation for the right edge is calculated and stored. During this time, the horizontal position of the vertex 74, $X_4$, appears on the input data bus 44. This data is caused by the input register controls circuit 32 under control of the microcode to be latched into the $X_R$ register 36. The microcode and control logic 33 also manipulate the signal on line 68 such that the buffer 70 is driven to a tri-state mode to isolate bus 48 from the output of the counter 42. When $X_4$ appears on the input bus 44, $X_3$ is on bus 48 and its inverted form is on bus 52. The adder 54 adds the data on buses 52 and 44 and adds 1 to the result to generate the numerator term, $X_4-X_3$, for the slope equation for the right edge 31. This term is stored in the pipeline register 58 temporarily until the numerator register (not shown) of a divider-right circuit 76 is available to store it. Also during time 6, the value of $X_3$ on bus 48 is caused by the microcode and the control logic 33 to be loaded into a current X register (not shown) inside an accumulator-R circuit 78. This loading operation is controlled by a control signal on a bus 80. A control signal on a bus 82 from the control logic 33 caused the value of $X_1$ to be loaded into the current X register inside the accumulator-L circuit 60 during time 4.

The current X register inside each of the accumulator circuits 60 and 78 stores the value of the starting point for the edge or the last intersection point between the previous raster line and the edge in question. To this value, the slope per scan line data calculated by the divider-left or divider-right (depending upon which edge is being manipulated) is added to determine the intersection point for the current scan line with the edge in question.

The purpose of the pipeline register 58 is to temporarily store results generated by the summer 54 until the numerator and denominator registers (not shown) inside the divider-left 72 and divider-right 76 circuits are available to store these results. Each of these divider circuits functions to divide the contents of the numerator register by the contents of the denominator register to calculate the slope of the particular edge in question. The slope so calculated is output on bus 84 in the case of the left edge and bus 86 in the case of the right edge. Each of these dividers sets a "done" flag when it is done with the division and the numerator and denominator registers are free to receive new data. The divider-left circuit 72 sets the done flag via control signal line 88, and the divider-right circuit 76 sets the done flag via control signal line 90.

Each of the divider circuits can only divide with positive numbers. Accordingly, a conditional 2's complement circuit 92 is provided having a data input coupled to receive the output result from the pipeline register 58 and having a data output 96 coupled to a data input of each of the dividers. The conditional 2's complement circuit gets data from bus 94 and passes positive numbers directly through to bus 96 unchanged. Negative numbers on bus 94 are 2's complemented and passed through to bus 96. The sign bit of every numerator and every denominator term is passed via a bus 95 to each of the divider circuits 72 and 76. The divider circuits each have two registers therein which latch the sign bits for the numerator and denominator terms. These sign bit registers are used by comparison circuitry to change the sign of the resulting slope output by either of the dividers when the sign bits for the numerator and denominator terms used to derive that slope are different. At time 7, the quantity $Y_4-Y_3$ for the denominator of the slope equation of edge 31 is calculated. This is done in a similar fashion as the calculation for the denominator term in the slope equation for edge 29. The quantity $Y_4$ appears on the input data bus 44, and is latched into the register $Y_R$, 40. Simultaneously, $Y_4$ is applied to one input of the adder 54 and the control logic 33 enables the buffer 70 via bus 68 thereby causing the counter output ($Y_1$ which is equal to $Y_3$) to be applied to bus 48 and its inverse to be applied to bus 52. The adder then outputs $Y_4-Y_3$ on bus 56 which is latched into the pipeline register and eventually loaded in the denominator register (not shown) of the divider-right circuit 76.

At time 8, the dividers do the slope calculation. To start this process, the microcode activates a control signal on the buses 100 and 102 to cause the dividers to start the divide process. When the dividers are done, the done flags are set and the slope-L and slope-R numbers appear on buses 84 and 86, respectively. These numbers are calculated according to the formulas given in FIG. 7.

The buses 84 and 86 are coupled to one of the data inputs of the accumulator circuits 60 and 78, respectively. Each of these accumulators includes an arithmetic logic unit having first and second data inputs and a current X data storage register. The output of the current X data storage register in each accumulator is coupled to one input of the arithmetic logic unit. The other data input of the arithmetic logic unit is coupled to receive the slope number for the appropriate side. Both the accumulator-left 60 and the accumulator-right 78 have internal registers which store the slope-L and slope-R values, respectively. The control logic 33 causes the slope values on the buses 84 and 86 to be latched into these internal registers after the dividers 72 and 76 calculate the slope information during time 8. The other inputs of the arithmetic logic units are coupled to these registers so as to receive the slope number for the current edge being processed.

The data output of the accumulator 60 is the horizontal position of the intersection between the current scan line and the left polygon side of interest. This data is on the bus 104. The data output of the accumulator 78 is the intersection of the current scan line with the right polygon side of interest, and is on bus 106.

The data input of the current X storage register is coupled to the bus 48. The control logic 33 and the microcode control the original loading of the current X data storage registers from the bus 48 through control signals in the buses 80 and 82.

Each accumulator outputs the current contents of the current X storage register, and updates the value in the current X storage register as each addition cycle is performed. That is, when the current X value is first stored before any addition cycle is performed, the output of the accumulator 60 will be whatever has been stored as the current X value. In the case of the sample polygon of FIG. 6, at time 8 before any addition of the slope number to the contents of the current X storage register is performed, the number on the bus 104 will be $X_1$. Likewise, at time 8, the number on the bus 106 will be $X_3$.

At time 9 in FIG. 7, the outputs on buses 104 and 106 are sent to any other circuits that need these intersection positions. This step is optional. However, in some systems, other circuits like the circuit of FIGS. 1A and 1B are used to calculate the positions, or other attributes like Gouraud shading intensity, texture map position or Z buffer depth for pixels along the scan line between the intersection points indicated by the data on buses 104 and 106.

Time 10 represents the time when the control logic 33 and the microcode cooperate to activate control signals on buses 80 and 82 to cause the accumulators to perform an addition cycle. Each accumulator then adds the slope number on the corresponding one of the buses 84 and 86 to the contents of the current X register and outputs the result as the intersection point for the next scan line for the corresponding edge. The contents of the current X register are then updated with the results of the addition for use in calculating the intersection point for the next scan line. Also, the counter 42 is decremented to obtain the scan line number for the next scan line.

Time 11 represents the process of repeating the events of times 9 and 10 until one of the scan line comparators 110 and 112 indicates that all the intersection points for one or both of the edges have been calculated. The comparators 110 and 112 are both adders like the adder 54. One data input of the adder 110 is coupled to the data output 120 of the $Y_L$ register 38 and the other data input is coupled to a bus 114. This bus 114 is coupled to the output 116 of the counter 42 through an inverter 118 and is also coupled to one data input of the adder 112 that monitors the status of processing of the right edge. The other data input of the adder 112 is coupled to the data output 122 of the $Y_R$ register 40. The inverter 118 serves the same function as the inverter 50 in inverting one of the two numbers being added by the adders so that a difference will result on the outputs of the adders. Each of the adders includes circuitry to add one to the result of the addition to obtain the correct binary representation of the difference between the current scan line number on bus 116 and the scan line numbers that pass through the vertices that terminate the edges being processed. As the scan line number in the counter 42 decreases, the differences between that number and the vertex vertical position numbers on buses 120 and 122 become smaller. Eventually, one or both of the differences becomes zero. At this point, the most significant bit of the result changes sign. It is these most significant bits of the outputs of the adders 110 and 112 which are the buses 124 and 126. Each of these buses is coupled to the data input of a latch or flag register which latch the change in sign to set a done flag meaning that all the intersection points for a particular edge have been calculated. The latch 128 serves as the done-right flag and the latch 130 serves as the done-left flag. The outputs of the latches 128 and 130, respectively, are the flag lines 132 and 134, respectively, coupled to the control logic 33. The control circuit 33 passes the states of the flags on lines 132 and 134 along to the microcode or control circuit which uses this information to restart the sequence of events for the next edge starting from the vertex that was just reached.

For example, in the polygon of FIG. 6, the processing of the right edge 31 will be completed first when the current scan line is the scan line that passes through the vertex 74. At that point, the adder 112 will find a zero difference between the current scan line number in the counter 42 and the contents of the $Y_R$ register 40, $Y_4$. This causes the line 126 to change states and this fact is latched by the latch 130 which raises the done-left flag. The microcode or control circuit coupled to control logic 33 then starts processing for the edge 136 by restarting the sequence of events to calculate the numerator $X_5-X_4$ and the denominator $Y_5-Y_4$ and the quotient of these two quantities representing the slope of the edge 136. Processing to calculate the intersection points of the scan lines with edge 136 is then performed as described above.

Figure 8:
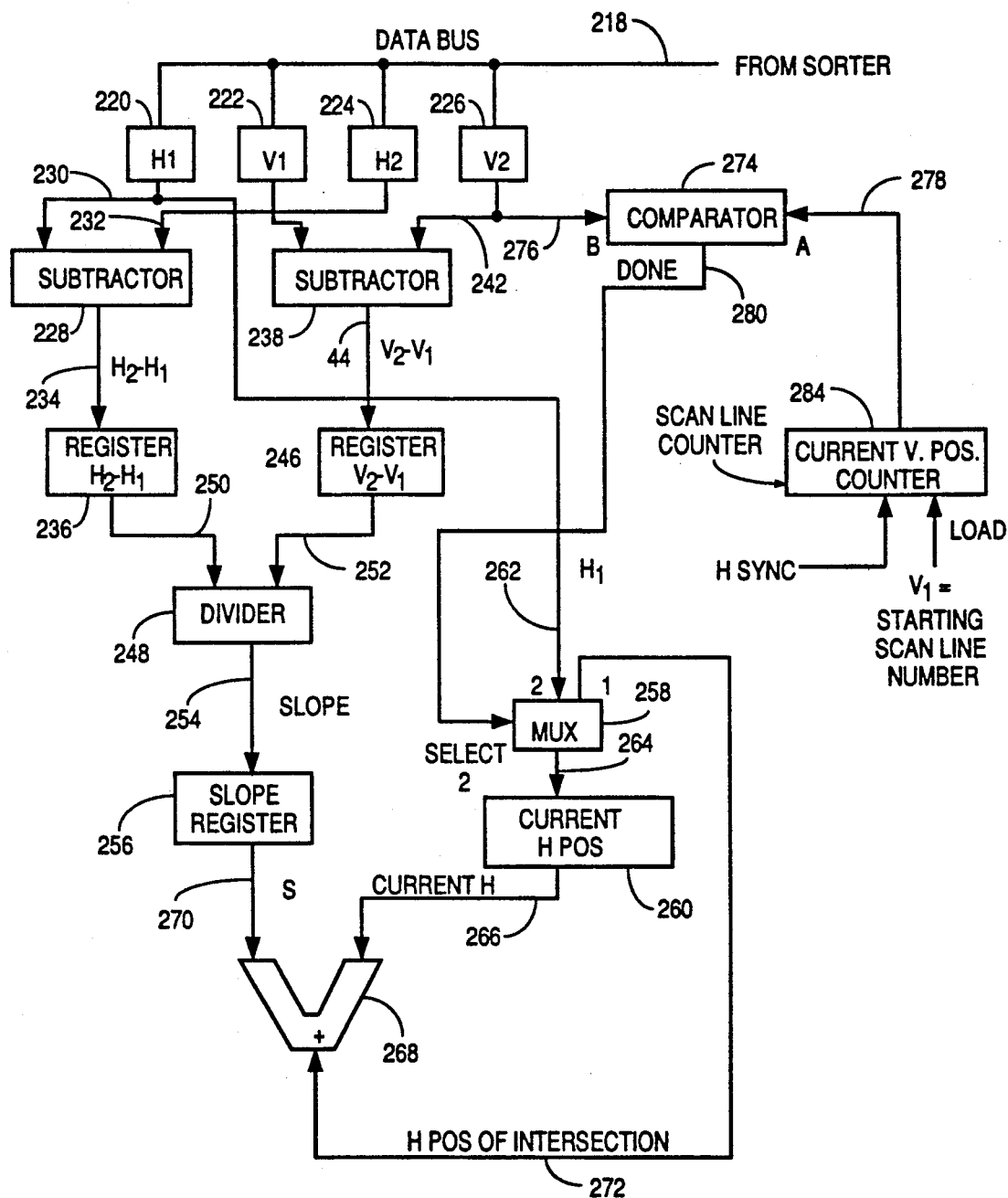
FIG. 8 is an alternative embodiment for a machine to do interpolation along one edge of a polygon.

Referring to FIG. 8, there is shown an alternative embodiment of the invention. The embodiment of FIG. 8 calculates the intersection points between scan lines and one edge only. A circuit capable of handling two edges simultaneously can be made using parallel circuits. Each of these parallel circuits will implement the structure shown in FIG. 8, although some of the circuitry of FIG. 8 may be shared between the two circuits.

The operation of the circuitry of FIG. 8 will be illustrated with regard to calculation of the intersection point 12 in FIG. 2. The mathematical equations implemented by the circuitry of FIG. 8 are of the same type as are used in the embodiment of FIGS. 1A and 1B. The slope of any particular edge is the change in horizontal position of the edge for a unit change in scan line number. Thus, in FIG. 2 if scan line 11 is the next scan line in the raster, the slope of the edge running from vertex 1 to vertex 2 is the difference in horizontal position between the intersection point 16 and the intersection point 12.

Turning to the circuitry in FIG. 8 which implements these relationships, data regarding the horizontal and vertical positions of the two vertices which define the edge in question enters on a bus 218. Typically, the data on bus 218 comes from a sorter which sorts the vertices in some ordered fashion, but this is not critical to the invention. It is only necessary that the horizontal and vertical position data for each of the two vertices which define an edge arrives in some order and that the control circuitry which controls the loading or registers, 220, 222, 224 and 226 get the appropriate data in the appropriate register. Register 220 is intended to store the horizontal position of the first vertex, while register 222 is intended to store the vertical position of the first vertex. Register 224 is intended to store the horizontal position of the second vertex, while register 226 stores the vertical position of the second vertex.

The numerator term of the slope equation is calculated by the subtractor 228. That is, the subtractor receives the $H_1$ horizontal position data via bus 230 and the $H_2$ horizontal position data on bus 232. The data on these two buses are then subtracted to yield the quantity $H_2$ minus $H_1$ on bus 234. This quantity is stored in a register 236.

A subtractor 238 generates the denominator term in the slope equation. The data for the vertical position for the first vertex arrives on a bus 240, while the data for the vertical position of the second vertex defining the edge arrives on the bus 242. The subtractor 238 subtracts the vertical position of the first vertex from the vertical position of the second vertex to generate the denominator term on bus 244. This result is stored in register 246.

The numerator term stored in register 236 is divided by the denominator term stored in register 246 by a divider 248. This divider receives the numerator term on bus 250 and the denominator term on bus 252 and provides a quotient term on bus 254. This quotient is the slope of the edge in question and is equal to the change in horizontal position of the edge defined by the data in the registers 220, 222, 224 and 226 for each increment in scan line number. This slope data is stored in register 256.

The circuit of FIG. 8 is responsible for calculating the intersection of each scan line with the edge in question. Therefore, the horizontal position of the starting vertex of the edge must be loaded and stored to implement the slope equation. This is accomplished by multiplexer 258 and register 260. The control circuitry first loads $V_1$ into the current vertical position counter 284. Then, the control circuitry causes the multiplexer 258 to select the horizontal position data $H_1$ of vertex 1 on bus 262. Thus, the horizontal position data $H_1$ is coupled onto bus 264. The control logic then causes the current H position register 260 to load the $H_1$ data and store it. The horizontal position $H_1$ then becomes the current H position and is supplied on a bus 266 to an adder 268. The other input of the adder is coupled to a bus 270 which carries the slope data S from the slope register 256. The horizontal position of the intersection of the first scan line below the first vertex and the edge in question is then calculated by adder 268 by adding the current horizontal position, i.e., $H_1$, to the value of the slope, thereby carrying out the intercept computation. That is, if the scan line 10 in FIG. 2 is the first scan line below the vertical position $V_1$ of the first vertex, then the horizontal position of the intersection point 12 is calculated by the addition performed in adder 268. The horizontal position of the intersection is then output on bus 272, which is coupled to one of the inputs of the multiplexer 258. The control logic then causes the multiplexer 258 to select the bus 272 for coupling to the bus 264 and causes the register 260 to store the horizontal position of the intersection as the new "current horizontal position."

The process then repeats itself for the next horizontal scan line. That is, the control logic determines when the next scan line is to be processed by monitoring a INCR signal on a bus 285 from the address computation logic. When this signal is activated, the intersection of a new scan line and the polygon edge in question is to be computed. The control circuitry then causes the adder 268 to add the data on buses 266 and 270. Assuming that the scan line 11 in FIG. 2 is the next scan line down in the raster scan pattern, then the adder 268 will generate on bus 272 the horizontal position of the intersection 16. This process continues for the edge between the first vertex and the second vertex until the vertical position of the current scan line reaches the vertical position of the second vertex, i.e., $V_2$.

When the current scan line has a vertical position equal to $V_2$, this fact will be detected by a comparator 274. This comparator receives at one input the vertical position of the second vertex which defines the edge being processed via bus 276 and receives the current scan line vertical position data via a bus 278. When these two values are equal, the comparator activates a control signal on line 280 which causes the multiplexer 258 to reselect the horizontal position data on bus 262 for coupling to bus 264 and loading as the new current horizontal position in register 260. Assuming that the next edge to be processed is the edge between the second and third vertices in FIG. 2, i.e., the edge 282, the registers 220 and 222 will have to be reloaded with new data prior to the time the control signal "DONE" on line 280 is activated. In the hypothetical situation given, the register 220 will be reloaded with the horizontal position of the first vertex-defining edge, i.e., the horizontal position $H_2$, and the register 222 will be reloaded with the vertical position of this vertex, i.e., $V_2$. Then, register 224 will be loaded with the horizontal position of the second vertex which defines the edge, i.e., $H_3$ and the register 226 will be loaded with the vertical position of the second vertex which defines the edge, i.e., $V_3$. The machine of FIG. 8 is then ready to process the intersections between the horizontal scan lines and the next edge 282.

The vertical position of the horizontal scan lines is counted by a current vertical position counter 284. At the start of processing, this counter is preloaded with the vertical position in scan lines of the first vertex which defines the edge being processed. In the hypothetical situation just given, where the edge 282 in FIG. 2 is to be processed, at the time when the current scan line passes through the second vertex, the counter 284 will be preloaded with the vertical position of the starting vertex, i.e., $V_2$. Likewise, at the start of processing of the edge between the first and second vertices, the counter 284 will have been preloaded with the vertical position of the first vertex, i.e., $V_1$. The counter 284 is incremented by the activation of the INCR signal. A comparator circuit 274 compares the current scan line number with the scan line number of the second vertex which defines the edge being processed. When the two numbers match, a DONE signal is activated which cause the multiplexer 258 to select input 2 so as to load the horizontal position of the first vertex of the next edge to process. This horizontal position will have been previously loaded into the register 220 by the control circuitry.

Figure 9A:
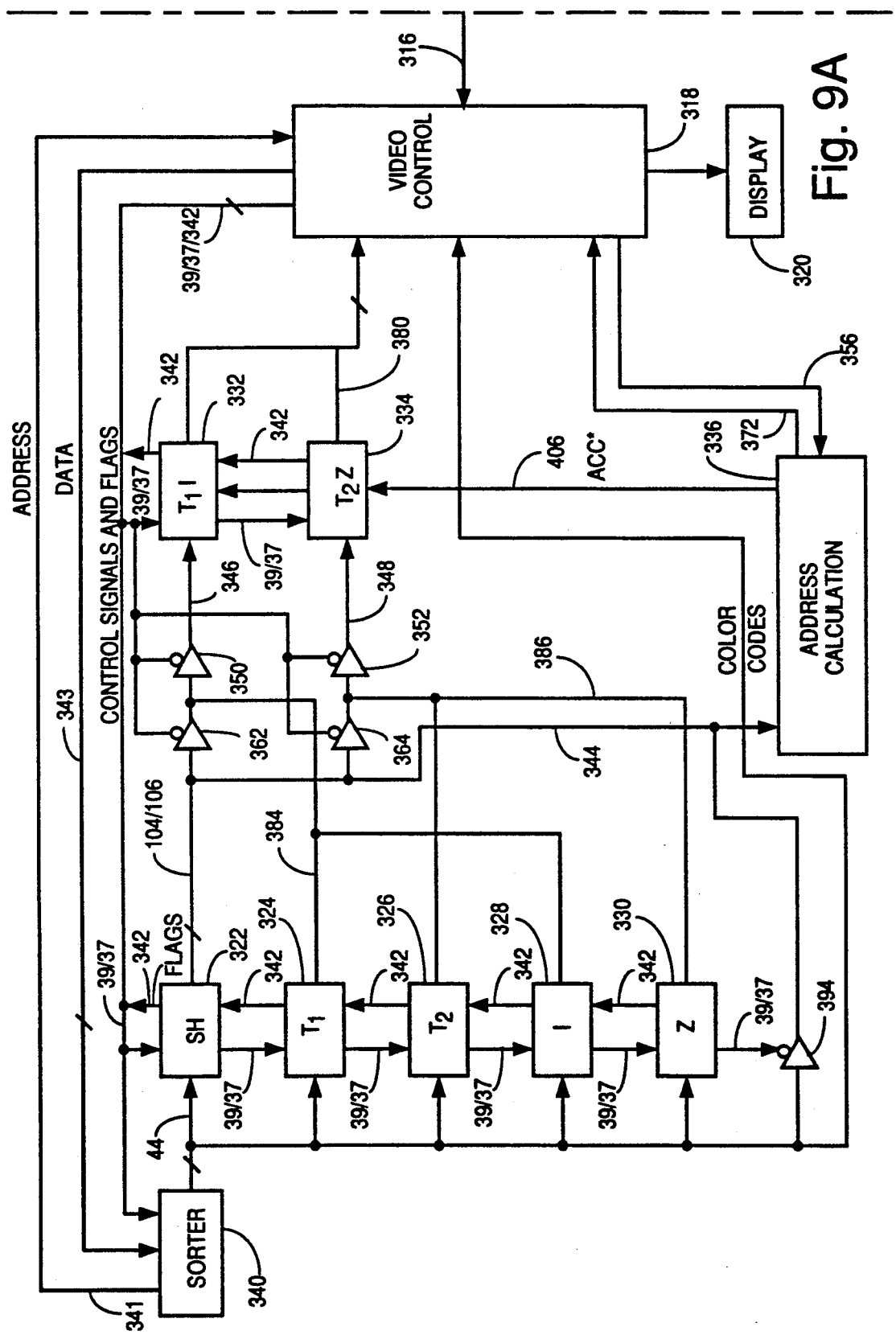
FIGS. 9A and 9B are a block diagram of one embodiment of a system according to the teachings of the invention.
Figure 9B:
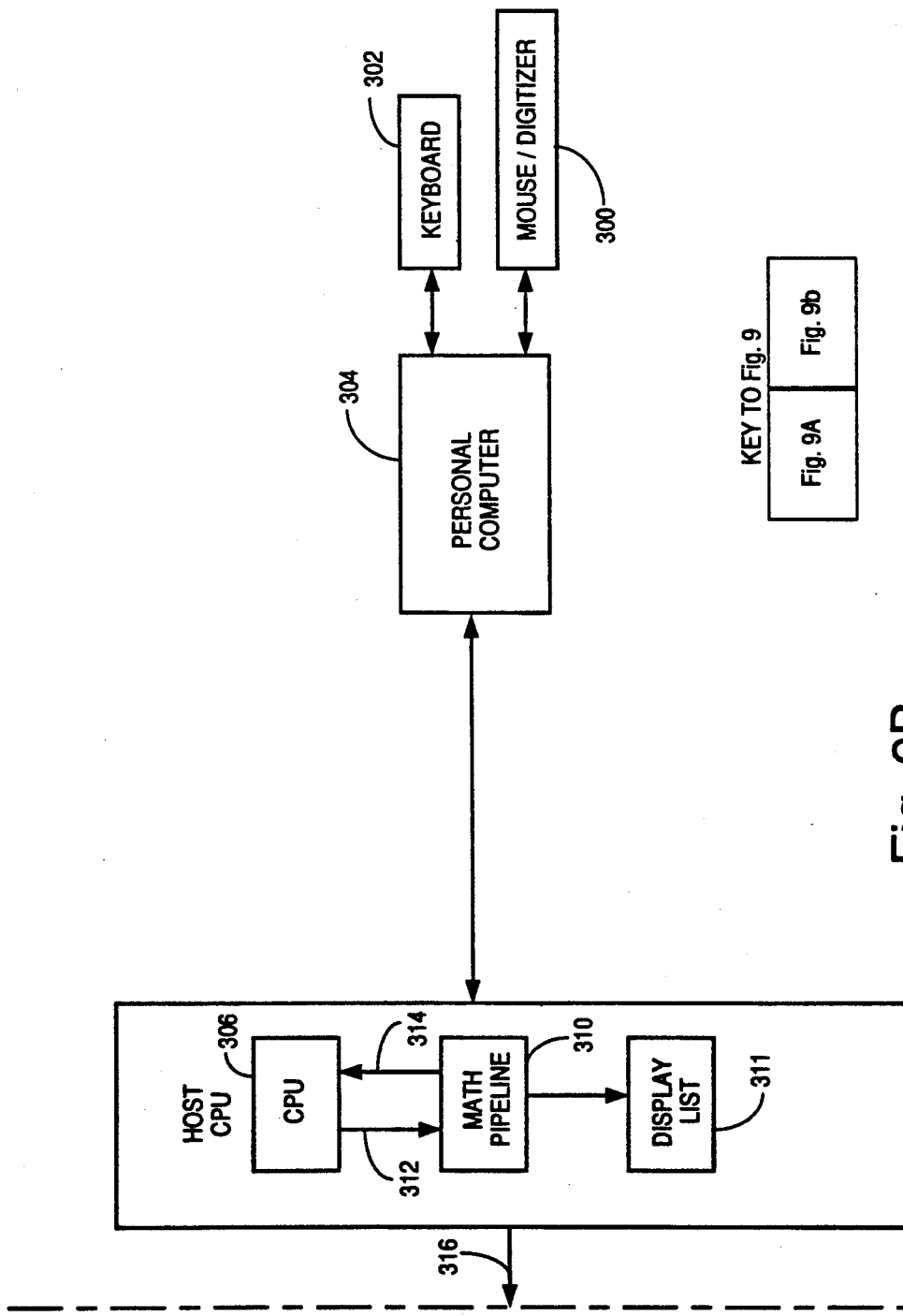

Referring to FIGS. 9A and 9B, there is shown a block diagram of a CAD system including a video system according to the teachings of the invention. FIGS. 9A and 9B may be assembled at the cut line to make a complete block diagram of the CAD system. The major components of the video system are on FIG. 9A.

The CAD system of FIGS. 9A and 9B accepts user inputs for controlling operation of the system via a mouse 300 and a keyboard 302 coupled to a personal computer 304. The personal computer essentially acts as a terminal in communicating user inputs to a host CPU 306 in the preferred embodiment although in alternative embodiments, the personal computer 304 may run the CAD application program to interface with the user and send data regarding the objects to be drawn and their positions and orientations to the host CPU.

In the preferred embodiment, the host CPU runs a CAD application program (which is not part of the invention). Basically, the host CPU 306 converts user inputs regarding the positions and shapes of objects to display instructions with the aid of a math pipeline circuit 310. The math pipeline circuit stores the display instructions in a database called the display list 311. The display list can take the form of data records stored in a data base stored in an external memory in a video control circuit 318, or it may be stored in internal memory of the host CPU as shown in FIG. 9B. In the preferred embodiment, the display list is stored in the video control circuit 318 and display instructions are sent from the host CPU to the video control circuit 318 via a bus 316.

The data base or display list contains data records which define the positions in a 2-D universe of a plurality of polygons, points and lines which define the appearance of an object to be displayed. The positions of these polygons are defined in terms of the location of one of the vertices of the polygon, hereafter called the key vertex, as well as offsets or displacements in space of the other vertices from this central vertex and a color code for the color of fill for the polygon. Other data pertaining to any particular polygon on the display list may include Gouraud shading intensity at vertices if Gouraud shading is desired, texture map variables if the polygon is to be filled with a texture map and/or Z-depth for each vertex if the polygon is to be Z-buffered. The positions of points are specified by horizontal and vertical position coordinates and a color code. Lines are specified on the display list by the positions of the two endpoints and a color code.

The host CPU 306 sends data regarding the objects defined by the user to a math pipeline circuit 310 via bus 312. The data sent to the math pipeline circuit 310 is a collection of data which indicates which polygons to display, where these polygons are in space and what is their orientation in the 3-D universe in addition to the other information identified above. The orientation in space of a polygon is indicated by a pointer to an orientation matrix. There are two such matrices. One is the viewer orientation matrix which defines the direction the viewer is looking and the other is an object orientation matrix which defines the object's orientation in space. These two matrices are concatenated in a matrix transformation process performed by the math pipeline 310.

The function of the math pipeline is to take the list of objects defined by the user and perform matrix math operations to rotate, scale, translate, clip and project the object and output a 2-D list of vertices in screen coordinates. The processes for rotation, scaling, translation in space, clipping and projection of an object from 3-D space to 2-D space are explained in a text by Foley and VanDam, Fundamentals of Interactive Graphics, Wiley Publishers (New York 1984) which is hereby incorporated by reference. Any circuitry or combination of hardware and software which can perform these processes will suffice for purposes of practicing the invention.

The math pipeline 310 operates independently to compute all the points or vertices to specify the view from the display list received from the host CPU 306. The output from the math pipeline to the display list is an ordered list comprised of a header and a list of all the vertices of all the polygons to be displayed expressed in 2-D screen coordinates.

If the display list is stored in the video control circuit 318, a sorter 340 accesses the data and instructions of the display list by sending addresses to the video control circuit 318 via a bus 341. The desired data and instructions from the display list are then sent back to the sorter 340 via a data bus 343. In alternative embodiments where the display list is stored in the host CPU, the sorter accesses the data in a similar manner from the host CPU and the display list stored in the host CPU memory.

There are three spaces in which coordinates can be expressed in the system. The objects being manipulated by the user have their positions expressed in the coordinates of a universe that is larger than either the video machine's space or the screen space and which will hereafter be referred to as the user universe. The math pipeline takes the coordinates of objects in the user universe and converts them to coordinates in the space of the video machine hereafter called the video universe. The video universe is 4 times larger than the screen space in the preferred embodiment so that larger screen space may later be adopted in enhanced versions of the system. The video machine clips objects in the video universe so that only objects in the video universe which are also in the screen space are displayed. The function of the video machine is to convert the data records output from the host CPU and math pipeline which define the display to an actual bit mapped display in a frame buffer inside video control circuit 318. Two "ping-pong" frame buffers are used in the video machine. Each of the frame buffers resides inside the video control circuit 318 along with other circuitry including circuitry to drive a CRT display 320. The data in one of the frame buffers is used by the video display circuitry in the video control circuit 318 to "paint" the display, i.e., to cause the various pixels on the display to have the proper color and intensity to depict the image defined by the vertex records generated by the math pipeline. While one frame buffer is being used to paint the display, the other frame buffer is available for "filling", i.e., the process of writing the pixel data for all pixels on the display to the memory locations in the frame buffer which correspond to the position of the screen of that pixel.

Three primitive entities are used by the video engine: point, line and polygon. The filling process entails writing data into the frame buffer which defines a bit map from the list of all the primitives to draw, where to draw them and what their shading is defined in the display list. This list of primitives is embodied in the data records received on bus 316 from the host CPU 306 and the math pipeline 310. The conversion from the primitive list to the bit map is done in part by interpolation circuits of the type shown in FIG. 1 and in part by the video display processor inside the video control circuit 318. The interpolation circuits are shown at 322, 324, 326, 328, 330, 332 and 334.

The data records from the display list received from the host CPU 306 are organized into packets with each packet having a particular organization depending upon what primitive is being expressed. Polygon data packets contain a polygon header, a color of fill code, a list of vertex records in counterclockwise order and a termination. Each vertex record has the organization and data fields defined earlier herein. The packet organization for a line primitive is two endpoints expressed in horizontal and vertical screen coordinates and a color code. The point primitive packet is a doublet of horizontal and vertical screen coordinates and a color code.

The interpolation circuits calculate various attribute values at all pixel locations on the screen from the packets. An address calculation circuit 336 then calculates the addresses in the frame buffer being filled in which the data calculated by the interpolation circuits is to be stored. The attribute data from the interpolation circuits is then written into the frame buffer being filled using the addresses corresponding to this attribute data obtained from the address calculation circuit 336 to create the bit map.

The video display circuitry in the video control circuit 318 reads the data out of the frame buffer after it has been filled at the time a new frame of data is to be painted. Color code data coming out of the frame buffer on the way to the display 320 is used to access a color mapping RAM in the video control circuit. The color mapping RAM returns actual RGB values which are used to control the three electron guns in the CRT display to paint the picture.

The video machine has the capability to individually Gouraud shade each polygon and/or texture map each polygon. Each pixel in the display is Z-buffered when Z-buffering is activated so that individual pixels of one polygon which are obscured by pixels of polygons which overlap and are closer to the observer are not painted thereby rendering a less confusing display. The video machine can also paint vector polygons which are unfilled polygons with only the edges visible.

In the preferred embodiment, the video machine is comprised almost entirely of custom LSI integrated circuits which perform the same functions done in software in the prior art. Also, the interpolation circuits work in substantially parallel fashion to calculate the data for the bit map while the address calculation circuit independently and in parallel calculates the addresses for the frame buffer. This keeps the speed of the video machine at very high levels and keeps the cost down. Typically, the video machine according to the teachings of the invention can paint 70,000 Gouraud-shaded, texture-mapped, Z-buffered, four-sided, 25-pixel polygons per second. Further, each polygon can be shaded by a different technique such as Gouraud shading, flat shading or no shading at all to preserve edges.

A more detailed look at the structure and operation of the video machine will now be given. The video control circuit 318 sends the object packets including the data records for all the vertices of all the polygons to be displayed from the display list to a sorter circuit 340. The purpose of this sorter circuit is to order the list of vertices received on bus 343 from the video control circuit 318. Since the raster pattern is drawn with parallel scan lines painted serially in order from the top of the screen to the bottom of the screen, processing can be speeded up by sorting the data records for the vertices into the order in which the vertices appear on the raster display. The sorted vertex records with their Gouraud shading intensity, Z-buffer and texture map position attributes are then made available for use by the interpolation circuits to calculate the Gouraud shading, texture map position and Z-buffer depth for each pixel in the raster.

To calculate the various attributes for all the pixels, the interpolation circuits are controlled via a bus 39/37 (reference numerals in FIGS. 9A and 9B which are the same as reference numerals in FIGS. 1A and 1B are referring to the same structures in both figures) This bus carries control signals from the microcode and the video display processor in the video control circuit 318. These control signals can be generated by a microcoded microprocessor, a sequential machine or a complex PLA. Which is used is not critical to the invention. The interpolation circuits send back their status flags on a bus 342.

The interpolation circuit 322 is controlled by the microcode to receive the horizontal and vertical position data on bus 44 from the sorter for 4 vertices that define the endpoints of a left edge and a right edge of the current polygon being processed. The polygons are processed in the order in which they appear because the sorter sends out the vertices of- the polygons in this order. The interpolation circuit 322 then calculates the intersection points between each scan line and the left and right edges of the current polygon in the manner described above in the discussion of FIGS. 1A and 1B.

The values of $X_1$ and $X_3$ are sent to the address calculation circuit 336 via a bus 344 and they are sent to the interpolation circuits 332 and 334 via the buses 346 and 348, respectively, through tri-state buffers 350 and 352, respectively. These two horizontal position values are used by the address calculation circuit in calculating the addresses for the storage locations in the frame buffer being filled which correspond to the pixels along the line between the vertices 27 and 35 in FIG. 6. The same two horizontal position values are used by the interpolation circuits 332 and 334 to calculate the values for the texture map position attributes $T_1$ and $T_2$ and the Gouraud shading attribute I and the Z-buffer depth attribute for the pixels along the line between vertices 27 and 35 in FIG. 6.

The interpolation circuits 332 and 334 compute the above noted attributes for the pixels along the lines between the points calculated by the interpolation circuit 322. The data calculated by the interpolation circuits 332 and 334 is used to fill the frame buffer pixel locations along each scan line.

The manner in which these "fill" calculations is done is to calculate the slope in the particular attribute in question between the intersection points calculated by the interpolation circuit 322 and to use the slope so calculated for an accumulation function which happens each time the address calculation circuit 336 calculates the address for the next pixel to the right along the particular line being filled.

For example, when the line between vertices 27 and 35 in FIG. 6 is being filled, the microcode sends control signals on bus 39/37 to the interpolation circuits 322 to enable tri-state output buffers 354 and 356 in FIG. 1B so as to put the values $X_1$ and $X_3$ on the bus 104/106. Simultaneously, the microcode and video display processor combine to put control signals on a bus 356 to the address calculation circuit 336 so as to cause the address calculation circuit to load these two horizontal position values in internal registers used to store the intersection points for scan lines. Also, control signals are sent on bus 356 to cause the address calculation circuit to begin calculating the addresses in the frame buffer that correspond in the bit map to the pixels along the line 360 in FIG. 6. Simultaneously, the microcode sends control signals to tri-state buffers 362, 364, 350 and 352 to cause the buffers to be enabled and couple the bus 104/106 to the busses 346 and 348. These busses 346 and 348 correspond for interpolation circuits 332 and 334 to the input data bus 44 in FIG. 1A. The bus 104/106 is a shared bus used by both accumulators 60 and 78 in FIG. 1B. The outputs of these accumulators are sequentially put on the shared bus 104 and 106 at the appropriate times by selective enabling of the tri-state buffers 354 and 356. The receiving circuits like the address calculating circuit 336 and the interpolation circuits 332 and 334 are controlled by control signals on the control buses 39/37 and 356 to load the $X_1$ and $X_3$ data appearing on the buses 346, 348 and 344 in the appropriate registers at the times that the corresponding data appears. While this loading process is going on, the microcode also sends control signals on the bus 39/37 to the interpolation circuits 324 and 328 to tri-state their respective output enable buffers corresponding to buffers 354 and 356 in FIG. 1 so as to isolate these outputs from the inputs of the various registers being loaded so as to avoid bus conflicts and loading of improper data.

Since the values of the attributes $T_1$, $T_2$, I and Z at each intersection are also going to be needed by the interpolation circuits 332 and 334, the microcode and video display processor also generate suitable control signals to cause the sorter 340 to output appropriate data and the interpolation circuits 324, 326, 328 and 330 to load this data. For each of the right and left edges being processed by the interpolation circuit 322, the sorter outputs data from the display list which gives the values for each of the attributes $T_1$, $T_2$, I and Z at each of the four vertices which define the endpoints of the right and left edges being processed. Appropriate control signals are generated to cause the sequence of events defined in FIG. 7 to occur in each of the interpolation circuits 324, 326, 328 and 330. The result is that simultaneously with the calculation of the-horizontal positions of the intersection points with each scan line by interpolation circuit 322, the other interpolation circuits are simultaneously calculating the values of the other attributes at each of the intersection points. That is, when the interpolation circuit 322 outputs the horizontal positions of the intersections with any particular scan line, the interpolation circuit 324 has available the values of the $T_1$ attribute at those intersection points. Similarly, the interpolation circuit 326 has the values of the $T_2$ attribute available at those intersection points, the interpolation circuit 328 has the values of the Gouraud shading intensity attribute I available at the intersection points, and the interpolation circuit 330 has the Z-buffer depth attribute available at the intersection points.

The address calculation circuit 336 examines the space between the intersection points of the scan line and the right and left sides, in this case $[X_1,Y_1]$ and $[X_3,Y_3]$, and determines how many pixels fit on the scan line running between these two points. Suitable addresses are then calculated for each of these pixels in the portion of the address space occupied by the frame buffer currently being filled. Both frame buffers are in the same address space but occupy different portions thereof. These addresses along with status information and control signals to control the writing process in the frame buffer being filled are sent to the video control circuit 318 via a bus 372. The status signals and write control signals for the frame buffer are also generated by the address calculation circuit 336. These control signals indicate to the video display processor when all the addresses for a particular scan line have been calculated and processing for a new scan line can begin. This allows the microcode and video display processor to generate the control signals to cause a new accumulation cycle in the interpolations circuits 322, 324, 326, 328 and 330 to be performed. Then the resulting data may be loaded into the fill interpolation circuits 332 and 334 and into the address calculation circuit 336 so that the filling process for the next scan line can be started.

The interpolation circuit 332 is responsible for calculating the $T_1$ texture map position attribute and the Gouraud shading intensity attribute I for each pixel along the scan line being processed. The interpolation circuit 334 is responsible for calculating the $T_2$ texture map position attribute and the Z-buffer depth attribute for each pixel along the scan line being processed. To do its function for the $T_1$ attribute, the interpolation circuit 332 must be given the $T_1$ texture map position attributes at each of the intersection points between the scan line being processed and the polygon right and left sides being processed. Loading of the $T_1$ texture map position attribute values at the intersection points is accomplished by the generation of suitable control signals by the microcode to cause the outputs of the interpolation circuit 324 to be sequentially enabled and to cause the $T_1$ values at each of the intersection points to be placed sequentially onto the bus 384. Other control signals are generated to enable the buffer 350 and to tri-state the buffer 362 so as to isolate the address calculation circuit and the interpolation circuit 322 to avoid bus conflicts. Other control signals cause the interpolation circuit 332 to load the data from the bus 384 into the appropriate registers at the appropriate times.

To do its function for the I attribute, the interpolation circuit 332 must be given the Gouraud shading intensity attributes I at each of the intersection points between the scan line being processed and the polygon right and left sides being processed. Loading of the I attribute values at the intersection points is done via the bus 384 in a manner similar to the manner described above for loading of the $T_1$ attribute values.

Similarly, the interpolation circuit 334 must be given the $T_2$ and Z-buffer depth attributes at each of the intersection points between the scan line being processed and the right and left polygon edges being processed. Loading of the $T_2$ and Z attribute data at the intersection points from the interpolation circuits 326 and 330 into the appropriate registers of the interpolation circuit 334 is accomplished in a manner similar to the process described above for loading of the $T_1$ and I attributes into the registers of the interpolation circuit 332. This is done by enabling buffer 352 and disabling buffer 364 to avoid bus conflicts.

Both the interpolation circuits 332 and 334 then calculate the slopes or rate of change *per pixel* for the various attributes between the intersection points calculated by the interpolation circuit 322.

The calculation of the rate of change per pixel is done by the interpolation circuits 332 and 334 in the same way the rate of change per scan line are calculated by interpolation circuits 322, 324, 326, 328 and 330. The sequence of events in loading the horizontal positions of the intersection points and the starting and ending pixel numbers in the interpolation circuits 332 and 334 for calculating the rate of change per pixel is similar to the sequence defined in FIG. 7, except that during times when the four Y position attributes would normally be loaded if intersection points were being calculated, corresponding starting pixel numbers are loaded instead. For example, during time 2, instead of loading the $Y_1$ position attribute, the starting pixel number is loaded into the counter. And during time 5, instead of loading the Y position attribute $Y_2$, the ending pixel number is loaded.

One slight difference in the operation of the interpolation circuits 332 and 334 is that since only one scan line is being processed for two different attribute rates of change, there are not four values for Y position variables. There is only one starting pixel number and one ending pixel number, and these two numbers are used in the slope calculations for both attributes calculated by each of the interpolation circuits 332 and 334. Likewise, since the two attributes calculated by each chip start at the same starting pixel number, the current value register in each accumulator in each of the interpolation circuits 332 and 334 stores the starting value for the particular attribute being interpolated ($T_1$, $T_2$, I or Z) when the current pixel is the pixel at the intersection point with the left edge received from the SH interpolation circuit 322. Interpolation then continues by the performance of an accumulation cycle each time a new pixel address on the current scan line is calculated until the pixel address and pixel number correspond to the pixel at the intersection point with the right edge calculated by the SH interpolation circuit. The microcode and video display processor adjust the control signals generated during control of these two interpolation circuits accordingly so that the right data gets into the right registers and counters at the right times.

After each of the interpolation circuits 332 and 334 does its rate-of-change calculation for each of the four attributes $T_1$, $T_2$, I and Z, this fact is signaled to the microcode by the flag signals on the bus 342. The microcode then signals the address calculation circuit 336 that the calculation of the individual addresses for each of the pixels on the scan line being processed may begin. As each new address is calculated, the address calculation circuit 336 signals this event to the microcode and video display processor via the status bus 372 and also sends a control signal to cause each of the interpolation circuits 332 and 334 to do an accumulation cycle and output the resulting data sequentially or in parallel on a bus 380. In the preferred embodiment, four separate buses are substituted for the bus 380, each carrying one of the four attributes calculated by the interpolation circuits 332 and 334.

The sorter 340 is also coupled to the control bus 39/37 such that it can be controlled by the microcode. The sorter's output bus, i.e., input data bus 44, is also coupled directly to the video control circuit 318 so as to be able to send color codes and other attributes to this circuit for use in the fill process.

The input data bus 44 is also coupled to address calculation circuit 336 through a tri-state buffer 394 which is under the control of the microcode. This data path provides the sorter and the microcode with a way to send the horizontal and vertical position data for point and line primitives directly to the address calculation circuit 336 for calculation of the addresses in the frame buffer. The microcode controls such transfers by turning on buffer 394 and isolating all other circuits coupled to the bus 104/106 except the circuits in the address calculation circuit 336 which are to receive the information.

The address calculation circuit 336 controls the accumulation function of the fill interpolation circuits 332 and 334 via a control signal ACC* on a bus 406. This signal is activated each time a new pixel address on the scan line being filled has been calculated by the address calculation circuit 336. This causes both interpolation circuits 332 and 334 to calculate the four attribute values $T_1$, I, $T_2$ and Z and to provide them on the output bus 380 after the microcode enables the tri-state output buffers in each of the interpolation circuits 332 and 334 corresponding to the tri-state output buffers 354 and 356 in FIG. 1B. Loading of the data calculated by the interpolation circuits 332 and 334 into the frame buffer can be sequential by sequential enabling of the tri-state output buffers or parallel if the bus 380 is comprised of four individual parallel buses. In the former case, the microcode controls the address calculation circuit 336 to prevent it from calculating a new address for the next pixel to be filled until all four attributes have been loaded into the frame buffer.

Figure 10A:
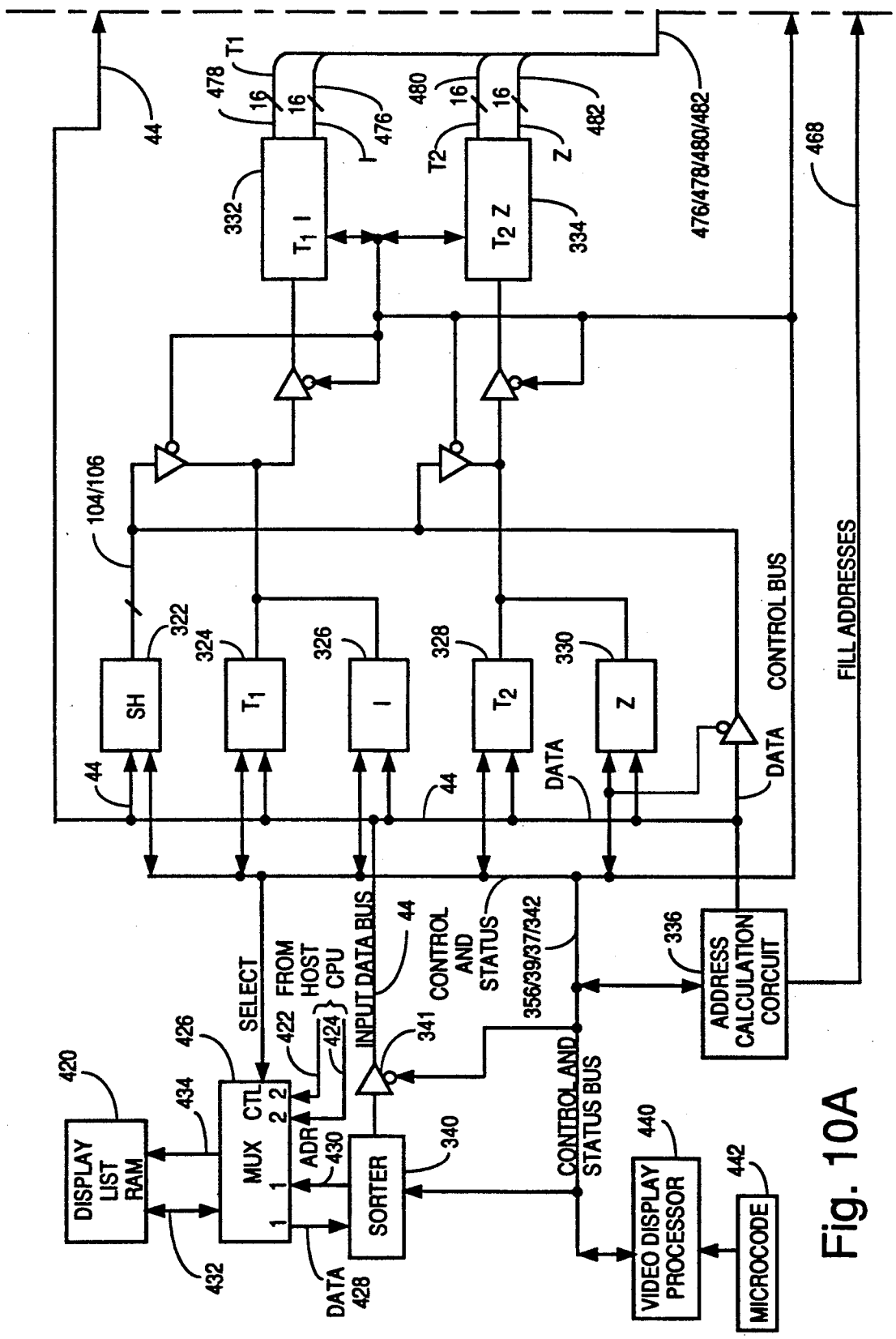

Referring to FIGS. 10A through 10D there is shown a block diagram of an alternative embodiment of the video system. Referring first to FIG. 10 A, there is shown the portion of the video system wherein the various intersection points between scan lines and polygon sides are calculated. Also calculated in the circuitry of FIG. 10A are the attributes $T_1$, $T_2$, I and Z for these intersection points and for the pixels along the scan lines between the intersection points for each scan line. In FIG. 10A, circuits and busses having identical reference numerals to circuits in FIG. 9A serve identical functions and operate in the same manner as the like-numbered circuits and busses in FIG. 9A.

A display list RAM 420 stores the data of the display list. This RAM is updated from the host CPU via busses 422 and 424 and a multiplexer 426. The busses 422 and 424 carry data and address information from the host CPU are coupled to one set of inputs of the multiplexer. A data bus 428 and an address bus 430 are coupled to another set of inputs. The multiplexer 426 selects either the pair of busses 428 and 430 or the pair of busses 424 and 422 for coupling, respectively, to data and address output busses 432 and 434. These output busses are coupled to the data and address inputs, respectively, of the display list RAM 420. The selection of which bus pair to couple to the RAM by the multiplexer 426 is controlled by the microcode via the control and status bus 356/39/37/342.

The control and status bus will hereafter be referred to as the control bus and is comprised of the combined busses 356, 39, 37 and 342 in FIG. 9A. This bus carries control signals, flags and other status signals. The control signals are generated by a video display processor 440 which runs a control program stored in microcode 442. The microcode causes various control signals on the control bus to be generated at appropriate times to coordinate operation of the video system in accordance with the operation of the system given in the foregoing discussion and in the discussion which follows. Further, various circuits in the system such as the address calculation circuit 336 and the interpolation circuits also generate flag and status signals which are read by the video display processor 440 via the control bus and used to coordinate generation of the control signals for smooth operation of the system.

The address calculation circuit 336 in FIG. 10A works the same as the address calculation circuit 336 in FIG. 9A in that addresses are calculated only for those pixels which define- a polygon within the viewing window. No addresses are calculated at pixel locations where no objects are to be drawn, such as in background locations.

A tri-state buffer 341 under the control of the microcode allows the sorter 340 to be electrically isolated from the shared bus 44 to eliminate bus conflicts when the bus is being used to transfer data between other circuits not involving the sorter.

Figure 10B:
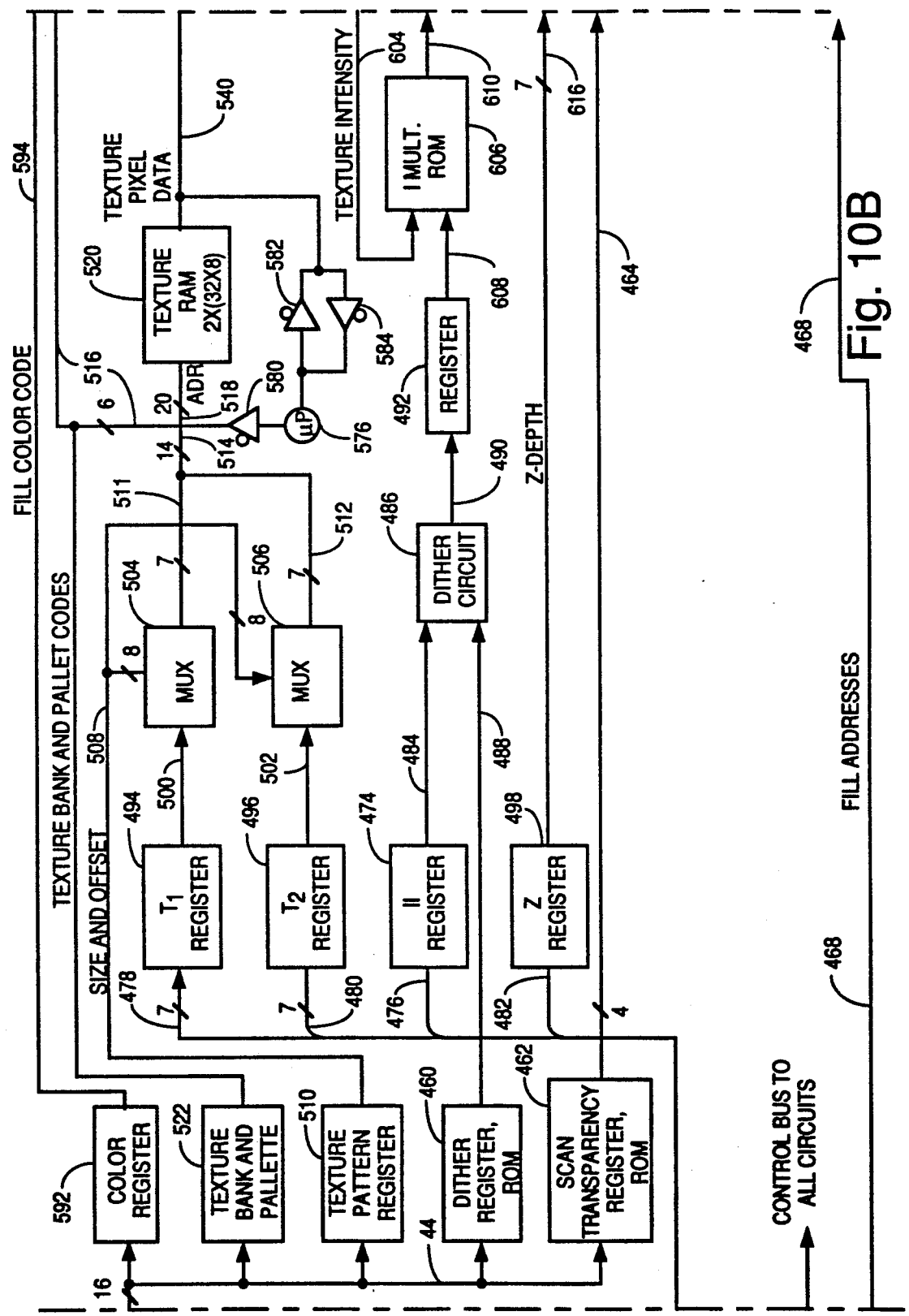
Figure 10C:
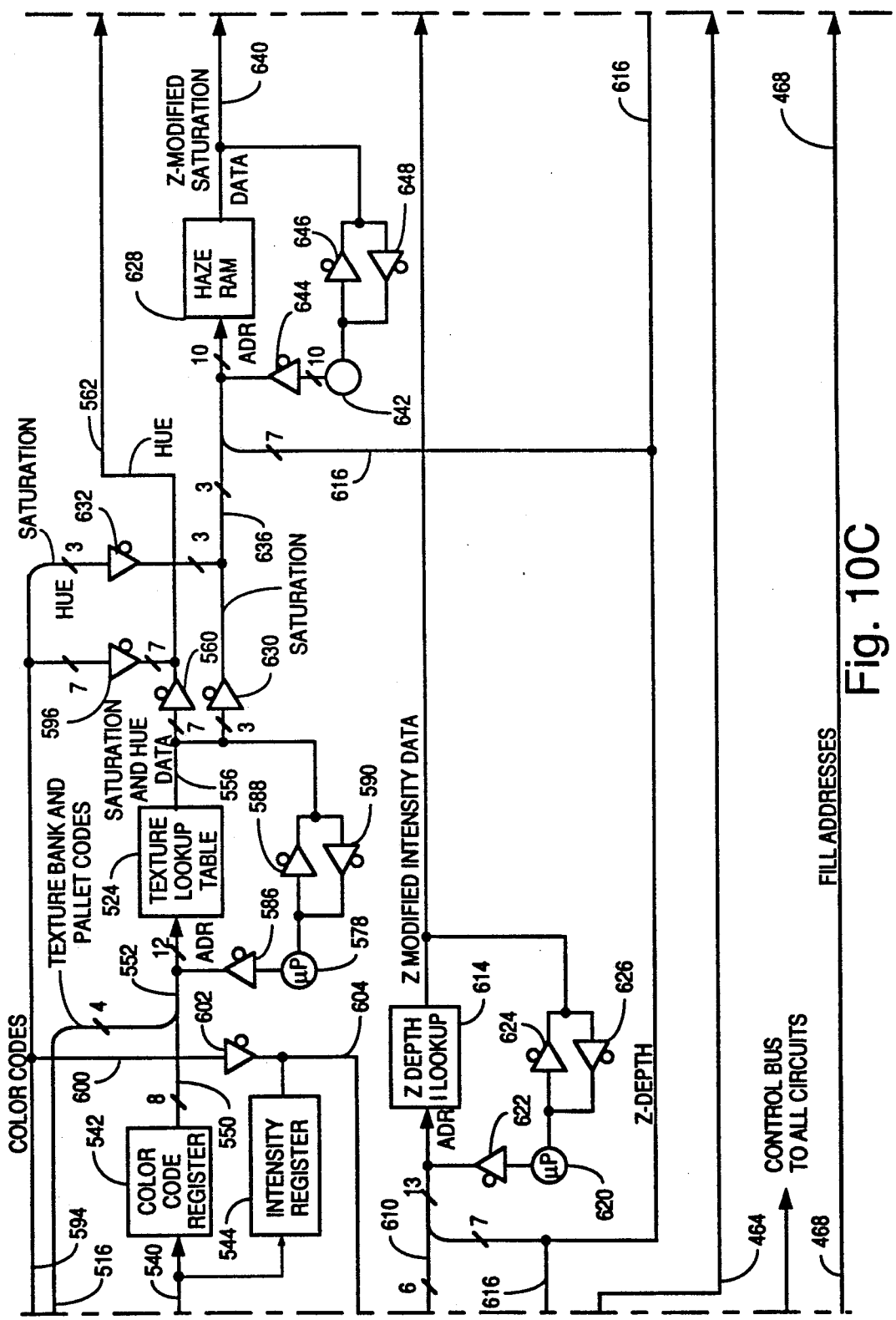

Referring to FIG. 10B, a dither register and ROM circuit 460 combine to store a dither code and a dither pattern. Dithering is a well-known technique to remove mach bands in Gouraud-shaded images. Dithering can be done in any one of several different patterns. The dither register in circuit 460 receives a code from the display list which identifies the desired dither pattern via the bus 44 from the output of the sorter 340. The dither code is used as an address to access a corresponding dither pattern stored in the RAM in circuit 460.

A scan transparency register and ROM circuit 462, receives a transparency code via bus 44 from the display list and sorter 340. This transparency code acts as an address to access a corresponding transparency pattern stored in the ROM in circuit 462. This transparency facility is a mechanism to partially override the effects of Z-buffering, although the transparency circuitry acts independently of the Z-buffering circuitry. In other words, the transparency pattern may be selected and will operate regardless of whether Z-buffering is on or off. When Z-buffering is on, the transparency code indicates the percentage of an overlapped polygon, i.e., a polygon which has a deeper Z-depth, which will be seen through the overlapping portions of polygons which are closer to the observer. The transparency code indicates which transparency pattern is in use. The transparency pattern is a geometric pattern that defines which pixels in a group of overlapped pixels to show and which not to show. Some transparency patterns are good for certain CAD applications while other transparency patterns are better for other CAD applications.

The transparency pattern is output on a bus 464 which is coupled to a write signal generation logic circuit 466 on FIG. 10D. The write signal generation logic receives the fill addresses on a bus 468 from the address calculation circuit 336. The write signal generation logic takes the fill addresses and uses them to control the timing for generation of various read and write control signals on a bus 470 coupled to the control inputs of the frame buffers A and B shown at 472 and 474. The control signals on bus 470 include RAS and CAS control signals as well as other standard write control signals needed for the type of memory chips used in the frame buffers 472 and 474. Any type of memory chip with suitable access times may be used in the frame buffers. The transparency code received on bus 464 suppresses certain of the write pulses for overlapped pixels in polygons to implement the transparency function. The transparency code on the bus 464 indicates which of the write pulses to be suppressed at fill time.

The Gouraud shading intensity attribute from the interpolation circuit 332 in FIG. 10A is latched into a Gouraud shading intensity register 474 on FIG. 10B. This register receives its input from a bus 476 which is coupled to the output of the interpolation circuit 332. The other three data outputs of the interpolation circuits 332 and 334 are coupled to busses 478, 480 and 482. Each of these buses is coupled to the data input of one of the pipeline registers 494, 496, 474 and 498 in FIG. 10B. The microcode controls latching of data from the fill interpolation circuits 332 and 334 into the pipeline registers.

The Gouraud shading intensity attribute is output on a bus 484 coupling the data output of the pipeline register 474 to a dither circuit 486. The dither circuit also receives the dither pattern on a bus 488 from the ROM in circuit 460. The dither circuit 486 then performs the dithering process on the Gouraud-shading intensity attribute, and outputs the modified Gouraud-shading intensity attribute on a bus 490 to a register 492.

The pipeline registers 494, 496, 474 and 498 serve as temporary storage registers to store the four attributes $T_1$, $T_2$, I and Z, respectively, after they are calculated by the interpolation circuits until they are needed by the next stages of processing circuitry. The register 494 receives the $T_1$ attribute via bus 478 from the output of the interpolation circuit 332. The register 496 receives and stores the attribute $T_2$ via the bus 480 from the output of the interpolation circuit 334. Likewise, the register 498 receives the Z-depth attribute via the bus 482 coupled to the output of the interpolation circuit 334.

The $T_1$ attribute stored in register 494 and the $T_2$ attribute stored in register 496 are output on busses 500 and 502, respectively, to multiplexers 504 and 506, respectively. These multiplexers 504 and 506 also have a second data input coupled to a bus 508 which is coupled to the output of a texture pattern register 510. If a particular polygon is to be texture mapped, as indicated by information in the display list, the multiplexers 504 and 506 are controlled by signals on the control bus to select the input data on busses 500 and 502 for coupling to the output busses 511 and 512, respectively. The two busses are concatenated to form a wider bus 514. Bus 514 is further concatenated with a bus 516 from the output of a texture bank and pallet register 522 to form the address bus 518. Bus 518 is coupled to the address inputs of a texture RAM 520. The texture bank and palette register 522 stores a code from the display list received on the input data bus 44 from the sorter 340. This code defines which bank and color palette in the texture RAM 520 is to be used for the texture map for a particular polygon. The busses 511 and 512 represent the positions in the bit mapped texture map picture stored in the texture RAM 520 that correspond to the pixel being filled in the bit map of the screen. These bits on busses 511 and 512 complete the address for the texture RAM 520.

The purpose of the texture RAM 520 is to store one or more texture map picture patterns to be used in filling polygons. The texture RAM stores only the pixel pattern of the texture but does not store any hue (color) or saturation data for those pixels. The color or hue and saturation data for the texture map is stored in a texture look-up table 524 in FIG. 10C. The attributes $T_1$ and $T_2$ which are encoded in the 14 bits on busses 511 and 512 define the horizontal and vertical position within the texture map picture stored in the texture RAM 520 which map to a particular pixel location on a polygon to be displayed on screen.

The texture pattern register 510 stores texture offset and size data received from the display list. This texture offset and size data allows a portion of a texture map to be used for the fill pattern for a particular polygon with the portion selected being replicated as many times as necessary to fill the entire polygon. In the event only a portion of the texture map is to be used, the offset and size data on bus 508 is used to address the texture RAM 520. In this event, the microcode controls the select inputs of the multiplexers 504 and 506 so as to select the data on bus 508 for coupling to busses 511 and 512. This data is then used to address the texture RAM 520 with the corresponding portion of the texture map defined by the offset and size data stored in the register 510 being output on a texture pixel data output bus 540.

The texture pixel data on bus 540 is comprised of color code data and intensity data. The color code data is stored in a color code register 542 on FIG. 10C, while the intensity data is stored in an intensity register 544. The color code register 542 stores color codes in the form of addresses which correspond to particular hue and saturation values stored in the texture look-up table 524. The address on bus 550 is concatenated with texture bank and palette code data on bus 516 to make up an address on bus 552 for the texture look-up table in RAM 524.

The texture look-up table 524, after having received the address on bus 552, outputs the addressed saturation and hue data for a particular pixel in the texture picture stored in texture RAM 520. This hue and saturation data is output on a bus 556 through a tri-state buffer 560 controlled by the microcode. The output of the tri-state buffer 560 is coupled to a bus 562 which is concatenated with several other buses to form a bus carrying the pixel attribute fill data stored in a register 564 on FIG. 10D. Register 546 is a pipeline register for temporary storage of the pixel attribute fill data until an address for the pixel corresponding to this fill data appears on the fill address bus 468. When the appropriate address appears, two address conversion ROMs 566 and 568 convert the address to the appropriate address in the appropriate address space for the particular frame buffer 472 or 474 which is being filled at the time. The address conversion ROM 568 converts the addresses on bus 468 to corresponding addresses on bus 572 coupled to the address inputs of a Z-depth buffer 574. The purpose of the Z-depth buffer is to store the Z-depth attribute of every pixel for purposes of comparison with the Z-depth of new pixels to be filled in the same bit map location, if any, to determine if the new pixel's attribute data should be written into the frame buffer or discarded. How this Z-buffering is done is explained in greater detail below.

When the appropriate address for a particular pixel appears, and the Z-depth data indicates that the pixel should be written into the frame buffer, the write signal generation logic generates the appropriate write signals and the pixel's attribute data is written into the frame buffer.

Both the texture RAM 520 and the texture look-up table 524 are capable of being rewritten, i.e., new data may be down-loaded by the host microprocessor. Thus, new texture maps and color palettes may be put in the system without reprogramming. The circuitry to rewrite these tables is symbolized by the microprocessors 576 and 578 and the associated tri-state buffers 580, 582, 584, 586, 588 and 590. These tri-state buffers are under the control of the host processor although the control lines are not shown for purposes of simplicity. This allows the host processor to be coupled and decoupled from the address and data lines of the texture RAM 520 and texture lookup table 524 so as to enable rewriting of these tables when so desired.

For non-texture mapped polygons, a color register 592 in FIG. 10B is loaded with hue and saturation color codes via the data bus 44 from the display list and sorter 340. These hue and saturation color codes are output on a bus 594 which is coupled through a tri-state buffer 596 to the bus 562. This allows hue and saturation codes to be written to register 564 when the texture look-up table 524 and texture RAM 520 are not in use. In other words, when the polygon currently being filled is not a texture mapped polygon, the microcode turns on the tri-state buffer 596 and turns off the tri-state buffer 560 thereby coupling the color register 592 to the register 564 such that hue and saturation color codes from the display list may be written directly into the frame buffer being filled. If a polygon is not texture mapped, it is filled with a uniform color having a particular hue and saturation value for all pixels. This data is calculated by the math pipeline for the polygon and is stored in the display list and, thereafter, in the color code register 592.

The color code data on bus 594 includes intensity data. This intensity data is stripped off bus 594 by bus 600 in FIG. 10C and is coupled through a tri-state buffer 602 to a bus 604. Bus 604 is coupled to an intensity multiplier in the form of a ROM 606 on FIG. 10B. Bus 604 is also coupled to the output of the intensity register 544 which stores the intensity value output from the texture RAM 520 on bus 540. This output is tri-state and is under control of the microcode. The microcode manipulates the tri-state buffer 602 such that either the intensity data stored in the intensity register 544 is placed on bus 604 for a texture mapped polygon, or the intensity data on bus 600 for a non-texture mapped polygon is placed on bus 604.

The intensity multiplier ROM 606 uses the Gouraud shading intensity attribute on a bus 608 and the intensity data on bus 604 concatonated as an address into a lookup table stored in the ROM. These two intensity values result in the output of a modified intensity value on a bus 610 thereby allowing either texture mapped polygons or non-texture mapped polygons to have their intensity data modified by the Gouraud-shaded, dithered intensity attribute on bus 608.

A Z-depth intensity look-up table 614 is used to modify the intensity data for any particular pixel based on the Z-depth of that pixel. The data on bus 610 provides a portion of the address used to access the Z-depth lookup table 614. This portion of the address from bus 610 defines the current intensity (V) level calculated by the intensity multiplier look-up ROM 606 after the dithering process. A Z-depth portion of the address used to access the Z-depth intensity look-up table 614 arrives on a bus 616. This bus is coupled to the output of the Z-attribute register 498. This register stores the Z-depth attribute calculated by the interpolation circuit 330 in FIG. 10A for each pixel. Using the combined bits from buses 610 and 616 to access the Z-depth intensity look-up table 614, a new intensity attribute for the particular pixel in question is output on a bus 618. In this way, the intensity of each pixel is modulated by the Z-depth of the pixel to give more realistic simulated depth cue effects.

The Z-depth intensity look-up table 614 may be rewritten with new data by the host processor as symbolized by the microprocessor 620 and the associated tri-state buffers 622, 624 and 626.

The intensity data on bus 618 is written into six bit positions of the register 564 in FIG. 10D. The Z-depth intensity look-up table 614 only modifies the intensity attribute according to the Z-depth while the hue, i.e., color, and saturation data for the pixel is unchanged.

Another circuit exists to modify the saturation data according to the Z-depth. This circuit is the haze RAM 628 on FIG. 10C. This RAM receives a 10-bit address on a bus 634 which includes both saturation and hue data along with Z-depth data and outputs Z-modified saturation data on a bus 640. Three bits of the address on bus 634 comprise saturation data arriving on a bus 636. The saturation data comes from either of two sources. If a texture-mapped polygon is being filled, the microcode enables a tri-state buffer 630 which couples the output bus 556 of the texture look-up table 524 to the bus 636. The microcode also controls a tri-state buffer 632 in this situation to be in a high impedance state thereby isolating the bus 636 from the color codes bus 594 coupled to the color register 592 in FIG. 10B. When a non-texture-mapped polygon is being filled, the microcode turns off the tri-state buffer 630 thereby isolating the bus 636 from the bus 556, and turns on the tri-state buffer 632. This couples the color code information on bus 594 from the color register 592 and the display list to the bus 636.

The remaining 7 bits of the 10 bit address for the haze RAM 628 are Z-depth data and arrive on bus 616 from the Z-register 498 in FIG. 10B. The combined saturation and Z-depth data bits are then concatonated and input as the 10-bit address to the haze RAM 628. The haze RAM outputs Z-modified saturation data on a bus 640. This Z-modified saturation data is written into three bits of the attribute data storage fill register 564 thereby completing the fill data in the register 564.

The fill data stored in register 564 is coupled via a data bus 642 to the data inputs of the frame buffers 472 and 474. This data is then written into the address corresponding to the particular pixel to which it pertains when the address conversion ROM 566 places that address on the bus 570 and the write signal generation logic 466 generates the appropriate write control signals on the bus 470.

The haze RAM 628 may be rewritten by the host processor as symbolized by the microprocessor 642 and the tri-state buffers 644, 646 and 648.

The Z-buffering capability of the circuit of FIGS. 10A through 10D is carried out by cooperation of the write signal generation logic 466 and the Z-buffer RAM 574. As the hue, saturation and intensity fill data for each pixel is being written into one of the frame buffers at the address that corresponds to that pixel, a corresponding address for the Z-buffer RAM 574 appears on bus 572. This address is output by the address conversion ROM 568. This ROM is a look-up table that converts the fill address on bus 468 to an actual address. This address, in conjunction with read control signals on bus 470 generated by the write signal generation logic 466 causes any Z-depth data stored in the Z-buffer at the address of the pixel currently being filled (such Z-depth data will only exist if two different pixels overlap on the screen and one of them has previously been written into the frame buffer) to be output on the bus 660. This Z-depth data is read by the write signal generation logic 466 via the bus 660 coupled to the data outputs of the Z-buffer 574. The Z-depth data for the previous pixel is compared by comparison circuitry inside the write signal generation logic 466 with the Z-depth attribute of the current pixel to be filled. This Z-depth attribute for the current pixel is stored in a pipeline storage register 662. The register 662 receives the Z-depth of the current pixel being filled via the bus 616 coupled to the output of the Z-register 498 in FIG. 10B.

When the write signal generation logic 466 determines that the Z-depth of the current pixel being filled is closer to the eye of the observer than the Z-depth of a pixel previously written at the same address, then the current pixel attribute data from the register 564 is written into the frame buffer. However, if the write signal generation logic 466 determines that the Z-depth of the current pixel to be written is greater than the Z-depth of a previously written pixel, then the write signal generation logic 466 suppresses the generation of write control signals on the bus 470. This prevents the writing of the hue, saturation and intensity data on bus 642 for the current pixel into the frame buffer. It also prevents writing of the Z-depth on bus 660 from register 662 into the Z-depth buffer. In other words, the pixel not written is a pixel which would be obscured by a pixel of a polygon which has a Z-depth closer to the eye of the observer. Of course the operation of the transparency circuit described above can override this Z-buffering effect as previously explained.

After a frame buffer has been filled with all the necessary data for a particular frame, the data for the frame is output on one of buses 664 and 666 to conventional video display circuitry 668. The display circuitry converts the hue, saturation and value or intensity data from the frame buffer for each pixel to RGB values by use of a look-up table. The RGB values output from the look-up table in the circuit 668 are then sent through digital-to-analog converters and converted to analog signals on a bus 670 which are used to drive the electron guns in a display 320.

The address and read control signals used for scanning the frame buffer being written to the screen are generated by the address calculation circuit 336.

Although the invention has been described in terms of the preferred and alternative embodiments described herein, those skilled in the art will appreciate numerous modifications which may be made without departing from the spirit and scope of the teachings of the invention. For example, each register in the circuit of FIGS. 1A and 1B could have its own input bus and parallel channels of circuitry could be used to calculate the numerator and denominator terms for the slope calculation rather than sharing one adder to calculate all these terms. Further, comparator could be used to verify when all required calculations for an edge have been completed. Further, a divider which can handle negative numbers could also be used thereby eliminating the need for the 2's complement circuit and the control logic to sense when the output of the adder 54 is negative and control the outputs of the dividers to change the sign when necessary. Further, a microprocessor or microprocessors could be used for the summing, dividing and accumulating functions in some embodiments with RAM for storage of the numerator and denominator terms and the control program to control the sequence of events.

What is claimed is:

1. A video system for generating a raster scanned display on a video display having a plurality of raster scan lines, each comprised of a plurality of pixels comprising:

(i) a plurality of attribute interpolation circuits coupled to operate simultaneously on different pixel attributes such as texture map coordinates $T_1$ and $T_2$, Gouraud shading intensity, I and Z-depth so as to provide parallel processing of a plurality of vertex attributes, each said interpolation circuit for calculating attribute interpolation data comprising the value of an assigned attribute at a plurality of locations on raster lines of said video display, each said attribute interpolation circuit comprising:

(a) first means for receiving attribute information regarding the value of some of said attributes at each of first and second points on said raster-scanned display and calculating the rate of change of said attribute per unit of distance between said first and second points;

(b) second means coupled to said first means and having a storage register, for receiving and storing in said storage register the value for said attribute at said first point and for adding to said value stored in said storage register the value of said rate of change of said attribute at predetermined times, and for storing the sum calculated for each new scan line in said storage register;

(c) third means for keeping a count of the current position for which a calculation is to be performed;

(d) fourth means for comparing the current position to the position for said second point and for activating a control signal when said current position indicates that all attribute values along a line between said first and second points have been computed;

(ii) a sorter circuit having an input for receiving data regarding said attributes at vertices of a plurality of primitive polygons having three or more sides coupled by vertices and having an output coupled to said plurality of said interpolation circuits for delivering attribute data regarding the values of said attributes at said vertices to the appropriate assigned one of said interpolation circuit for interpolation of other values for the attribute;

(iii) a texture RAM means for storing one or more texture map patterns to be used in filling polygons, said texture RAM means being accessed by an address corresponding to the interpolated attribute data of texture map coordinates $T_1$ and $T_2$;

(iv) a frame buffer for storing video fill data;

(v) video means coupled to said attribute interpolation circuits for receiving attribute interpolation data calculated by said attribute interpolation circuits consisting of said texture map coordinates $T_1$ and $T_2$, Z-depth and Gouraud shading intensity I calculated for each pixel and for generating said video fill data based upon said attribute interpolation data and for storing said video fill data in said frame buffer;

(vi) address calculation means coupled to said attribute interpolation circuits and to said video means for calculating addresses for use in writing said video fill data into said frame buffer and for generating control signals causing predetermined ones of said attribute interpolation circuits to calculate attribute interpolation values at pixel locations along a raster scan line of said raster scanned display; and (vii) control means coupled to said sorter circuit, said address calculation circuit, said attribute interpolation circuits and said video means for generating control signals to cause loading of the appropriate vertex attribute data from said sorter into the corresponding attribute interpolation circuits and parallel processed, virtually simultaneous calculation of attribute interpolation data by all said attribute interpolation circuits on the different pixel attributes and virtually simultaneously mapping of said attribute interpolation data to corresponding texture-mapped, Gouraud-shaded, Z-buffered video fill data, and to cause the generation of said addresses by said address calculation means and the filling of said video frame buffer with said video fill data.

2. The apparatus of claim 1 further comprising dither means coupled to said plurality of attribute interpolation circuits and to said frame buffer for dithering away mach bands in Gouraud-shaded images.

3. The apparatus of claim 1 further comprising scan transparency means coupled to said sorter circuit and to said frame buffer for allowing a transparency pattern to be selected which determines what percentage of an overlapped polygon with a deeper Z-depth which will be seen through the polygon which overlaps the overlapped polygon when the contents of said frame buffer are displayed.

4. The apparatus of claim 1 further comprising pipeline storage means coupled to said attribute interpolation circuits for storing the values of attributes calculated by said attribute interpolation circuits until said attribute values are needed for the next stage of processing.

5. The apparatus of claim 1 further comprising hue and saturation means coupled to said texture RAM means for supplying hue and saturation data to be used in filling texture mapped polygons the data for which is stored in said frame buffer.

6. The apparatus of claim 5 further comprising color code and intensity data storage means for storing intensity data and color code data which corresponds to particular hue and saturation data used for texture mapping.

7. The apparatus of claim 1 further comprising texture pattern register means coupled to said texture RAM means for storing size and offset data which control which part of said texture map is used for texture mapping operations.

8. The apparatus of claim 1 further comprising Z-depth buffer means to store the Z-depth of each pixel calculated by said appropriate attribute interpolation circuits for comparison by said video means in filling said frame buffer so as to implement Z-buffering.

9. The apparatus of claim 1 further comprising a reprogrammable texture look-up table and RAM means for storing alterable texture pattern and color palette data such that the texture pattern and color palette used for texture mapping can be changed on the fly.

* * * * *